US011434869B2

(12) United States Patent
Hug et al.

(10) Patent No.: US 11,434,869 B2
(45) Date of Patent: Sep. 6, 2022

(54) VERTICAL WIND TURBINE WITH CONTROLLED TIP-SPEED RATIO BEHAVIOR, KIT FOR SAME, AND METHOD FOR OPERATING SAME

(71) Applicant: AGILE WIND POWER AG, Dübendorf (CH)

(72) Inventors: Thomas Hans Hug, Weisslingen (CH); Christian Oram, Berg am Irchel (CH)

(73) Assignee: AGILE WIND POWER AG

(*) Notice: Subject to any disclaimer, the term of this patent is extended or adjusted under 35 U.S.C. 154(b) by 83 days.

(21) Appl. No.: 16/625,876

(22) PCT Filed: Jun. 30, 2017

(86) PCT No.: PCT/IB2017/053972
§ 371 (c)(1),
(2) Date: Dec. 23, 2019

(87) PCT Pub. No.: WO2019/002922
PCT Pub. Date: Jan. 3, 2019

(65) Prior Publication Data
US 2020/0149508 A1 May 14, 2020

(51) Int. Cl.
*F03D 3/00* (2006.01)
*F03D 7/06* (2006.01)

(52) U.S. Cl.
CPC .............. *F03D 3/005* (2013.01); *F03D 7/06* (2013.01)

(58) Field of Classification Search
CPC .......... F03D 3/005; F03D 7/06; F03D 7/0224; F03D 7/0228
See application file for complete search history.

(56) References Cited

U.S. PATENT DOCUMENTS

| 3,902,072 A | 8/1975 | Quinn ............................ 290/44 |
| 4,410,806 A | 10/1983 | Brulle ........................... 290/44 |

(Continued)

FOREIGN PATENT DOCUMENTS

| CN | 102116264 A | 7/2011 |
| CN | 202991352 U | 6/2013 |
| CN | 104314751 A | 1/2015 |
| EP | 2 235 365 B1 | 4/2015 |

(Continued)

OTHER PUBLICATIONS

English translation of the International Preliminary Report on Patentability issued in PCT Application No. PCT/IB2017/053972 dated Jan. 9, 2020.

(Continued)

*Primary Examiner* — Viet P Nguyen
(74) *Attorney, Agent, or Firm* — Ostrolenk Faber LLP

(57) ABSTRACT

A vertical wind turbine that includes a plurality of vertical vanes which is secured to a vertical vane axis so as to be rotatable independently of one another about a respective vane rotational axis and which are rotatably mounted about a vertical rotor rotational axis on a common circular path. A method for operating a vertical wind turbine, in which method pitch angles of vertical wind turbine vanes driven about a respective vertical vane axis are specified. The vertical wind turbine is operated in a particularly efficient and material-preserving manner by control of the pitch angles, at least in a partial load mode of the vertical wind turbine, such that the vanes rotate with a substantially constant tip-speed ratio.

21 Claims, 16 Drawing Sheets

(56) References Cited

U.S. PATENT DOCUMENTS

| | | | | |
|---|---|---|---|---|
| 4,430,044 A | * | 2/1984 | Liljegren | F03D 7/06 416/119 |
| 4,494,007 A | | 1/1985 | Gaston | 290/44 |
| 4,609,827 A | | 9/1986 | Nepple | 290/44 |
| 5,503,525 A | | 4/1996 | Brown et al. | 416/24 |
| 2010/0096854 A1 | * | 4/2010 | Paluszek | H02P 9/04 290/44 |
| 2011/0305569 A1 | * | 12/2011 | Kim | F03D 3/068 416/5 |
| 2012/0045329 A1 | * | 2/2012 | Smith | F03D 7/06 416/1 |
| 2015/0192105 A1 | | 7/2015 | Chu | |

FOREIGN PATENT DOCUMENTS

| | | |
|---|---|---|
| WO | WO 2014/026688 A1 | 2/2014 |
| WO | WO 2015/185299 A1 | 12/2015 |

OTHER PUBLICATIONS

International Search Report dated Apr. 6, 2018 in corresponding PCT International Application No. PCT/IB2017/053972.

Written Opinion dated Apr. 6, 2018 in corresponding PCT International Application No. PCT/IB207/053972.

Office Action dated Feb. 3, 2021 issued in corresponding Chinese Patent Application No. 201780092775.8 [without English translation].

Zhang Lixun et al., "Pitching Laws of Smart Variable-Pitch Vertical Axis Wind Turbine", ACTA Energiae Solaris Sinica (2013), vol. 34, No. 8, pp. 1427-1433 [with English Translation of Abstract].

L. Zhang et al., "Vertical Axis Wind Turbine with Individual Active Blade Pitch Control", College of Mechanical and Electrical Engineering, Harbin Engineering University, *IEEE* (2012).

I. Paraschivoiu et al., "H-Darrieus Wind Turbine with Blade Pitch Control", *International Journal of Rotating Machinery*, vol. 2009, Article ID 505343, 7 pages (2009).

R. Shrivastava, "Efficiency Improvement of a Straight-Bladed Vertical Axis Wind Turbine", *People's Journal of Science & Technology*, ISSN: 2249-5487, vol. 2(1), pp. 16-19, Jan.-Jun. 2012.

Office Action dated Jul. 5, 2021 issued in corresponding Chinese Patent Application No. 201780092775.8 [without English translation].

Wei Yuexiao, "Integrated Design for Small Variable Pitch Vertical Axis Wind Turbine", China Academic Journal Electronic Publishing House (2013) 76 pages [English Translation of Abstract only].

* cited by examiner

VERTICAL WIND TURBINE WITH CONTROLLED TIP-SPEED RATIO BEHAVIOR, KIT FOR SAME, AND METHOD FOR OPERATING SAME

CROSS-REFERENCE TO A RELATED APPLICATION

The present application is a 35 U.S.C. §§ 371 national phase conversion of PCT/IB2017/053972, filed Jun. 30, 2017, the contents of which are incorporated herein by reference. The PCT International Application was published in the German language.

The present invention relates to a vertical wind turbine, as well as a kit for a vertical wind turbine, and a method for operating a vertical wind turbine.

TECHNOLOGICAL BACKGROUND

Vertical wind turbines with active blade control are known from the prior art. WO 2015/185299 A1 on behalf of the applicant discloses a vertical wind turbine with vertical blades, that are each driven by a servomotor via a transmission into a predetermined rotational position around their respective axis of rotation, which position can be changed at any time; virtual cam disks are provided, which respectively determine the course of the blade angle by means of the position of the blade on the circle of revolution, and wherein the active control is carried out in accordance with the virtual cam disks.

Further, European patent EP 2 235 365 B1 on behalf of the applicant relates to a wind turbine with at least one rotor, which can be rotated around a vertical axis and which, between two horizontal bearing planes disposed at a distance on top of each other, comprises a plurality of rotor blades, which are disposed uniformly distributed on a circumferential circle and can each be pivoted around a vertical pivot axis and the pivot range of which is delimited on both sides by a limit stop.

Furthermore, the document U.S. Pat. No. 3,902,072 A discloses a wind powered generator with a horizontal, rotating platform on the outer circumference of which a plurality of vertical blades is positioned, which all revolve coaxially around a central axis and each rotate around an individual axis. The rotation of the vertical blades depends on changes in the wind direction and wind speed and the rotation of each individual blade is controlled so that for ¾ of the rotation path of the platform, power is drawn from the wind, while for the rest of the path, the blades are adjusted so that they offer minimal resistance to the wind. The blades are controlled by means of a central transmission mechanism with a shared servomotor.

The document U.S. Pat. No. 4,410,806 A describes a vertical wind turbine with a rotating structure, which includes a series of rotatable vertical blades positions of which are controlled to maintain a constant rotation speed of the rotating structure, when wind speed is sufficient. A microprocessor controller processes information about the wind speed, wind direction, and rotation speed of the rotating structure and produces an electrical signal for adjusting the blade position. The control system for the wind turbine includes electrical blade actuators that modulate the blades of the rotating structure. Blade modulation controls the angle of attack, which in turn determines the rotation speed of the rotor. A wind speed sensor provides data for starting or stopping the system and a wind direction sensor is used to keep the blade flip region at 90° and 270° relative to the wind direction. The control system is designed to maintain constant rotation speed at wind speeds of between 19 and 40 miles per hour.

The document U.S. Pat. No. 4,494,007 A discloses a vertical wind turbine, wherein the orientation of the blades revolving around a common central axis is controlled by a tail vane by means of a shared mechanism during their rotation around the central axis such that if the wind speed changes, the rotation position of the blades is changed.

The document U.S. Pat. No. 4,609,827 A describes a vertical wind turbine with rotor vanes that are airfoil-shaped. A positive and synchronous vane orientation system is controlled by a mechanism located exterior to its rotor.

Finally, in "Vertical Axis Wind Turbine with Individual Active Blade Pitch Control"; College of Mechanical and Electrical Engineering; Harbin Engineering University; Harbin, China; 2012 IEEE, Lixun Zhang, Yingbin Liang, Erxiao Li, Song Zhang, and Jian Guo describe a vertical wind turbine with individually active blade control, wherein servomotors are mounted on the arms supporting the blades and each by means of a belt drive, are intended to perform a pitch angle adjustment of the blades in accordance with their azimuth angle.

In "H-Darrieus Wind Turbine with Blade Pitch Control"; International Journal of Rotating Machinery, vol. 2009, Ion Paraschivoiu, Octavian Trifu, and F. Saeed address a variation of the pitch angle of the blades of a vertical wind turbine in accordance with the azimuth angle in order to maximize a torque output by the rotor of the vertical wind turbine.

In "A Straight-bladed Variable-pitch VAWT Concept for Improved Power Generation"; ASME 2003, Wind Energy Symposium, vol. 2003, pp. 146-154; January 2003, Y. Staelens, F. Saeed, and I. Paraschivoiu describe experiments for improving the performance of vertical wind turbines with blades, a pitch angle of which is variable. At each blade, the tangential force should be optimized by varying the pitch angle in the respective rotational position in accordance with the azimuth angle. Different blade profiles are studied.

In vertical wind turbines that are known from the prior art, it is disadvantageous that the blade control and blade drive do not enable a satisfactory energy yield and reasonable efficiency. In addition, the blade drive consumes too much energy and is susceptible to wear, which minimizes the efficiency and service life of the systems in an unsatisfactory way.

DISCLOSURE OF THE INVENTION

One object of the invention is to avoid at least some of the disadvantages of the prior art. In particular, the efficiency and service life of vertical wind turbines should be improved in comparison to the prior art.

In particular, the disadvantages of the prior art are overcome by means of a vertical wind turbine according to the invention with a plurality of vertical blades, which are each fastened to a respective vertical blade axis such that they are pivotable independently of one another around a respective blade rotation axis, and are supported rotatable on a common circular path around a vertical rotor rotation axis, the vertical wind turbine being configured to control a pitch angle of the blades at least in a partial load mode of the vertical wind turbine such that the blades rotate with an essentially constant tip speed ratio $\lambda$.

With a method according to the invention, the disadvantages of the prior art are overcome by predetermining pitch angles of vertical blades of the vertical wind turbine, which blades are driven around a respective vertical blade axis, wherein the pitch angles, at least in a partial load mode of the vertical wind turbine, are controlled such that the blades rotate with an essentially constant tip speed ratio $\lambda$.

The solution according to the invention has the advantage that the tip speed ratio $\lambda$ can be selected such that the angle between the incidence vector of the wind and the rotor blade chord (the so-called pitch angle or also referred to as the angle of attack) does not exceed a value at which the flow separates from the profile. The tip speed ratio $\lambda$ is defined by the ratio of the rotational speed of the rotor to the wind speed. Up to a nominal speed, vertical wind turbines according to the invention have a tip speed ratio $\lambda$ of 2 to 2.5, preferably approx. 2.3, which is determined by a circumferential speed of the blades of approx. 27.6 m/s at a wind speed of 12 m/s during nominal operation ($\lambda=27.6/12=2.3$).

The higher the tip speed ratio, the smaller the angle of attack relative to the profile. In reality, this means that vertical wind turbines according to the prior art are generally operated with tip speed ratios $\lambda$ of greater than 4. This necessarily results in high rotation speeds or alternatively to high rotor radii in order to achieve the circumferential speed that is required for the tip speed ratio. High circumferential speeds in turn increase parasitic losses, which are caused by the aerodynamic drag of rotor arms and guys, for example. Such losses influence the energy output by the cube of the circumferential speed.

A pitch control of the blades according to the invention helps to keep the tip speed ratio as optimally constant as possible and compensates for negative effects of strongly and quickly changing wind conditions. Thereby, an optimal energy yield, particularly in partial load operation, is achieved. Consequently, vertical wind turbines according to the invention make it possible to utilize wind energy in an economically efficient way even in locations with widely varying wind conditions.

In addition, high circumferential speeds contribute to a high noise emission and to high centrifugal accelerations. Through a continuous control of the rotor blades of the kind that is implemented in vertical wind turbines according to the invention, in principle any tip speed ratio can be used with the optimal angle of attack. In other words, a stall can be avoided even with low tip speed ratios. It is thus possible for the optimal operating range to be evaluated in a way that takes into account parasitic resistances.

Numerical simulations with a DMS model (double multiple stream-tube) for vertical wind turbines according to the invention in accordance with an exemplary embodiment show a maximum energy yield at a tip speed ratio of for example $\lambda=2.3$. Including geometrical dimensions of vertical wind turbines according to the invention, this yields circumferential speeds of approx. 100 km/h, which leads to significantly lower noise emissions than in conventional horizontal wind turbines and vertical wind turbines that are known from the prior art because the circumferential speed affects the acoustic power to the sixth power.

Furthermore, in connection with a wind farm efficiency of vertical wind turbines, which is approx. 20% and is thus more advantageous than a wind farm efficiency of horizontal wind turbines, which is approx. 10%, vertical wind turbines that are configured and operated according to the invention can be operated more efficiently and economically than horizontal wind turbines, particularly in wind farms, or more precisely stated, can be operated at twice the wind farm efficiency. In addition, unlike horizontal wind turbines, vertical wind turbines according to the invention can be operated in a power range of for example 750 kW generator output power, which is ideal for the rapidly growing sector of the "distributed wind market" in which environmentally friendly and socially responsible solutions are very relevant (populated areas, logistically challenging wind locations).

In addition, vertical wind turbines according to the invention have an advantageous wake behavior. Since the blades are held in their angular position in a variable manner by means of the pitch motors, which helps prevent stalls, this minimizes turbulence in the wake. A resulting low turbulence intensity in the wake allows for shorter distances between vertical wind turbines according to the invention and thus further improves their wind farm efficiency.

As a result of small and/or lightweight components, in contrast to horizontal wind turbines, it is possible to set up vertical wind turbines without heavy transport even in difficult terrain. In normal terrain, all of the components of a vertical wind turbine (even heavy ones) can be transported using a conventional truck without special transport. In mountainous terrain, the components can be transported by a light helicopter and the few heavy components can be transported by an off-road vehicle.

Vertical wind turbines according to the invention can be installed using a self-assembly system without the use of additional heavy-duty cranes. The self-assembly system includes a central crane that grows along with a tower or tower system of a vertical wind turbine according to the invention and heavy-duty lifting rollers that are positioned in the tower. All of the heavy main components can be hoisted to their respective installation heights by means of a mobile cable winch on the ground and deflection sheaves in the tower.

For repair-related disassembly and assembly work on the rotor blades and blade bearings, only a small crane is temporarily positioned at the very top of the respective rotor arm with the aid of a helicopter. For simple maintenance and repair work on the rotor, the rotor is locked in position by positive-fit engagement. In the case of rotor bearing damage, generator damage, or transmission damage, disassembling the rotor does not require removal thereof. When stopped, it is mechanically secured to a lifting device on the tower and a thrust bearing supporting the rotor is thus freed of the rotor load. This securing can withstand gale forces. The components possibly requiring repair can then be lowered without a crane, using a cable winch and deflection sheaves in the tower and can be directly loaded onto a truck at the bottom.

Finally, with regard to their environmental impact, the vertical wind turbines according to the invention are also advantageous in that the silhouette of their vertically oriented rotor is more visible to birds and bats than a horizontally rotating three-blade rotor. In addition, at a maximum of 100 km/h, the rotor blade speeds are significantly lower than with horizontal wind turbines in which blade tip speeds of 300 to 400 km/h occur. In contrast to horizontal wind turbines, the relatively slowly rotating rotor system of a vertical wind turbine according to the invention has a calm shadowing and a small ice throwing range. The appearance of a vertical wind turbine according to the invention, with its predominantly vertical lines, integrates well into the surrounding landscape.

The solution according to the invention can be arbitrarily enhanced and further improved by means of the following embodiments, which are each advantageous in and by themselves; a person skilled in the art will easily recognize in a clear and unambiguous way that apparatus features of a vertical wind turbine according to the invention constitute the basis for corresponding steps of a method according to the invention and vice versa.

According to a first further embodiment of a vertical wind turbine according to the invention, the vertical wind turbine is designed to operate in the partial load mode in a range of wind speeds that at least partially lie between 3 and 12 m/s. Such a partial load range is suitable for both inland and coastal sites and ensures a high energy yield as well as a relatively large number of full load hours per year. With a low starting speed of 3 m/s, the partial load range also ensures that a vertical wind turbine according to the invention is able to supply power even in a light wind.

According to another embodiment, the constant tip speed ratio amounts to between 2 and 2.6, preferably between 2.2 and 2.4, and most preferably essentially 2.3. A value range of this kind for the constant tip speed ratio results in relatively low rotation speeds of the rotor and therefore relatively low blade speeds. As a result, a vertical wind turbine according to the invention, as already mentioned above, can be operated with advantageously low environmental influences.

According to another embodiment, the vertical wind turbine is configured to control the pitch angle so that in a nominal operation mode of the vertical wind turbine, the blades rotate with a variable tip speed ratio. A pitch control according to the invention can thus contribute to limiting the output of a vertical wind turbine according to the invention. This prevents damage to the material of a vertical wind turbine according to the invention and thus reduces wear on it and extends its service life.

According to another embodiment, the vertical wind turbine is configured to control the pitch angle so that in the nominal operation mode, the blades rotate at an essentially constant nominal speed. As a result, the rotor rotates in a nominal speed range. This helps to avoid load peaks on components of the vertical wind turbine and therefore helps to prevent damage to the material of a vertical wind turbine, reduce wear, and increase service life.

According to another embodiment, at a first cut-out wind speed $v_3$ of the vertical wind turbine, the variable tip speed ratio $\lambda$ amounts to between 1 and 1.8, preferably between 1.3 and 1.5, most preferably essentially 1.38. For example, the cut-out wind speed $v_3$ can be in the range of 20 m/s. Particularly at such a relatively high wind speed, the relatively low value range of the variable tip speed ratio helps to keep the circumferential speed of the blades as low as possible and thus to ensure that a vertical wind turbine according to the invention is very environmentally friendly.

According to another embodiment, the vertical wind turbine is configured to control the pitch angle in a start-up mode so that starting from a resistance mode with tip speed ratios of $\lambda \leq 1$, the blades transition into a fast mode with tip speed ratios of $\lambda > 1$. It is thus possible, particularly when starting the vertical wind turbine from a rotor standstill, to make optimal use of the energy absorbed by the blades based on their wind resistance and to maximize a start-up torque on the rotor. As soon as the rotor has reached a certain rotation speed, a smooth transition to the fast mode of the blades can be carried out. This helps to shorten the overall start-up times of a vertical wind turbine according to the invention and thus helps to increase the energy yield.

According to another embodiment, the control of the pitch angle is based on at least one cam disk, which determines the pitch angle in an essentially continuous manner for an entire rotation of the rotor. A continuous determination of the pitch angle enables the gentlest, smoothest possible control and regulation of a vertical wind turbine according to the invention with the least number of parameter jumps of the kind that can occur when pitch angles are predetermined in rough, discrete steps. Different cam disks can be specified for different wind speeds. Each of the cam disks can be optimized with regard to the respective wind speed and with regard to the resulting flow conditions at the blades.

According to another embodiment, a maximum value of the pitch angle for windward positions of the blade is generally greater than for leeward positions of the blade, with respective regard to the rotor rotation axis. In other words, for azimuth angles of less than 180°, the pitch angle can generally be less than for azimuth angles of between 180 and 360°. The pitch control thus takes into account the respective flow conditions at the blades as a function of the azimuth angle. In particular, this therefore takes into account leeward flow effects caused by the rotor and blades themselves such as turbulence and wakes, making it possible to further improve the energy yield of a vertical wind turbine according to the invention.

According to another embodiment, for wind speeds in the range of a nominal wind speed, at an azimuth angle of 0° measured from a zero line oriented perpendicularly to the wind direction, the pitch angle is less than zero. In other words, the blade is thus rotated into the wind with a pitch angle of less than 0° or more precisely stated, changes from leeward to windward. This contributes to improved dynamics of a vertical wind turbine according to the invention and thus to an increased energy yield.

According to another embodiment, at least for wind speeds in the vicinity of the nominal wind speed, with azimuth angles of 0° to 90° measured from a zero line oriented perpendicularly to the wind direction, there is a local maximum of the pitch angle. This helps to optimize the lifting forces acting on the respective blade. Thereby, the dynamics and energy yield of a wind turbine according to the invention are further improved.

According to another embodiment, the vertical wind turbine has at least one wind speed sensor and/or at least one wind direction sensor, which is positioned on at least one of the blades and is connected in a signal-transmitting manner to a control device for determining a setpoint of the pitch angle. As a result, wind speed and/or wind direction as relevant measurement variables can be advantageously determined at the blade and can be determined as close as possible to a closed loop control system for adjusting the pitch angle, which system includes the blade and for example a pitch drive mounted on it or positioned in the vicinity thereof. This promotes a pitch control that is as precise and error-free as possible.

According to another embodiment, at wind speeds from still air up to a further cut-off speed of the vertical wind turbine, an amount of a positioning error in the control of the pitch angle is essentially always less than 5°, preferably less than 3°, most preferably less than 1.5°. By means of such low positioning errors it is possible on the one hand to increase the energy yield of a vertical wind turbine according to the invention. On the other hand, this also makes it possible to minimize undesirable incorrect loading as well as vibrations and the like of the vertical wind turbine because largely without deviation, the rotation of the blades corresponds to a predetermined set-point value or set-point pitch angle.

According to another embodiment, a vertical wind turbine according to the invention is provided in the form of a kit. As has already been mentioned above, such a kit, which essentially includes all of the components and parts of the vertical wind turbine and tools for the installation thereof, such as cranes, winches, and the like, makes it possible to install a vertical wind turbine according to the invention in sites that are not accessible or hardly accessible for horizontal wind turbines. A preparation of a vertical wind turbine according to the invention in the form of a kit also helps to ensure that all of the components, parts, and tools that are required for the installation, operation, and maintenance of the vertical wind turbine stem from verified supply sources and satisfy desired safety and quality requirements.

According to another embodiment, a method according to the invention for operating a vertical wind turbine can be improved by predetermining the angular positions by means of pitch cam disks. Thereby, set-point values for adjusting the angular position are provided for essentially every azimuth angle. Different pitch cam disks can be provided for different wind speeds.

According to another embodiment of a method according to the invention, a wind speed, wind direction, and rotor rotation of a vertical wind turbine rotor comprising the blades are included in the continuous control. It is thus possible for a vertical wind turbine according to the invention to be operated with the smallest possible set-point deviations of the angular positions and thus in an extremely efficient way.

Further, the disadvantages from the prior art can be overcome by means of a vertical wind turbine according to the invention with a plurality of vertical blades, which are each fastened to a respective vertical blade axis such that they are pivotable in a motor-driven manner independently of one another around a respective blade rotation axis, and are supported rotatable on a common circular path around a vertical rotor rotation axis, wherein the blade axes are each being provided with at least one pitch motor for motor-driven pivoting of the blades, a motor shaft of which extends concentrically to the respective blade rotation axis.

With a method according to the invention, the disadvantages of the prior art are further overcome in that angular positions are predetermined for vertical blades of the vertical wind turbine that are driven around a respective vertical blade axis, wherein the angular positions are continuously controlled by means of a direct drive of the blades through a respective pitch motor positioned concentrically to the blade axis.

This has the advantage that it enables a very precise and energy-saving driving of the blades in accordance with pitch cam disks. The angular positions of the blades can be optimally set without delay and taking into consideration the varying system conditions (wind speed, wind direction, rotor rotation, power output, etc.) at a power consumption of the pitch motors of at most less than 10% to preferably less than 0.5%, for example 0.3%, of a generator output power of the vertical wind turbine.

According to a further embodiment of a vertical wind turbine according to the invention, the pitch motor is embodied as a torque motor with at least one rotor that is torsionally rigidly coupled to the blade axis. For example, the torque motor can be embodied as a permanently excited brushless DC motor with an internal-rotor design. The rotor, which is thus surrounded along its outer circumference by a stator of the pitch motor, can be torsionally rigidly coupled in a simple and effective way to a motor shaft of the pitch motor with the aid of a clamping set.

According to another embodiment, the blade axes are supported on motor bearings in the pitch motor. In other words, the blades can be secured in a rotatable manner in the pitch motor. For example, the bearing can be implemented by means of tapered roller bearings, rolling bearings, or conical roller bearings, which are positioned in an axially prestressed fashion between the blade axis and motor on the one side and the stator on the other in order to absorb both axial forces and radial forces. This enables a precise positioning of the blade axes with a long service life and a highly efficient driving of the blade axes by means of the pitch motor with low friction losses.

According to another embodiment, the motor bearings are positioned in a bearing receiving chamber that is sealed up against the surroundings of the vertical wind turbine with the aid of sealing elements. The bearing receiving chamber can contain lubricant such as grease for lubricating the motor bearings. Preferably, the bearing receptacle is filled with the lubricant, which is replaced or refilled, respectively, every 5 years, depending on the requirements. Thereby, an effective lubrication of the motor bearings is achieved, which helps to further maximize the service life of a vertical wind turbine according to the invention.

The bearing receiving chamber can in turn be sealed relative to a motor interior with the aid of additional sealing elements such that the motor interior is protected from harmful environmental influences in an essentially hermetically sealed way. The motor interior can be at least partially formed by a motor housing and/or enclosed by it.

An expansion or compensation vessel can be connected to the hermetically sealed motor interior in a fluid-conducting way via at least one fluid line and can constitute a changeable expansion or compensation volume in order to compensate for temperature-induced volume changes of fluids, in particular air, contained in open spaces inside the motor chamber. To avoid the presence of open spaces in the motor interior, space-filling elements can be positioned in the motor chamber, which can be formed of foam material, for example. The expansion vessel and space-filling elements on the one hand help to prevent humidity from condensing in the motor interior. On the other hand, expansion vessel and space-filling elements prevent bearing lubricant and/or motor lubricant such as grease from being displaced or escaping when pressure fluctuations occur.

According to another embodiment, the blades can be supported rotatable around their blade rotation axis at at least one additional bearing point arranged at a distance from the pitch motor. In this way, the pitch motor can, for example, be positioned between two additional bearing points. There are thus two respective blade sections per blade, namely a blade section between the upper bearing point and the pitch motor and a blade section between the pitch motor and the lower bearing point.

Preferably, a bearing unit is positioned at each of the outer ends of the blade pointing away from the pitch motor. The bearing unit includes a housing, two roller bearings, and a hollow shaft that connects the rotor blades of the blades to one another. At the additional bearing points, spherical roller bearings can be used, which absorb high radial forces occurring mainly at the blade ends and help to stiffen the rotor system as a whole. By contrast, the motor bearings can include, for example, two axially prestressed conical roller bearings that absorb the entire weight force of the blades.

According to another embodiment, the blade axes can each include a vane axis section in the region of a vane of the blade and a transition section positioned between the vane axis section and the motor shaft. The transition section and motor shaft can, for example, be integrally formed of a single piece of metal. The transition section allows for an optimal connection between the motor shaft and the vane axis section.

According to another embodiment, the transition section tapers in a direction extending away from the motor shaft. For example, the transition section can be shaped in the form of a stud. An outer diameter of the motor shaft can be greater than an inner diameter of the vane axis section. The transition section thus helps to overcome dimensional differences between the motor shaft and the vane axis section and to connect them to each other in a precisely fitting way.

According to another embodiment, the pitch motors each have a motor housing at which a blade mount is mounted that connects the blades to a rotor hub of the vertical wind turbine. The blade mount can, for example, include a plurality of struts. At least one of these struts can be directly connected to the pitch motor in order to secure the respective blade.

According to another embodiment, the blade mount includes a plurality of struts, with at least one respective strut being flange-mounted to the motor housing. On the outside of the motor housing in the region of an outer circumference of the stator, each strut can be advantageously flange-mounted onto the end of the pitch motor. This permits a weight-reducing, highly stable design of the rotor as a whole since the pitch motor simultaneously functions as a driving point, bearing point, and connecting point between the blade mount and the blade.

According to another embodiment, the motor housing includes support ribs, which extend radially to the motor shaft and connect a bearing seat of the pitch motor on the side of an outer circumference of the bearing seat to a wall of the pitch motor housing facing in axial direction. Such support ribs help to reliably transmit forces that the motor shaft introduces onto the motor housing via the bearing points to a connection point of the blade mount on the motor housing, for example the above-mentioned motor flange. The rigidity of the motor housing is increased while its weight is kept as low as possible.

According to another embodiment, the pitch motor is cased-in with a casing that is formed in accordance with aerodynamic aspects. The casing can minimize an aerodynamic drag caused by the pitch motor, which helps to further increase the efficiency of a vertical wind turbine according to the invention. In addition, the casing helps to minimize any intermediate spaces between the blade sections and between the blade sections and the motor and thus to prevent a pressure compensation at the intermediate spaces. In a similar way, casings or covers can also be provided in the region of the additional bearing points or bearing units between the blade sections in order to counteract pressure compensation and the efficiency loss that this entails.

According to another embodiment, the vertical wind turbine has a control device for control of the pitch motors, that is connected in a signal-transmitting manner to the pitch motors and to at least one wind speed sensor and/or at least one wind direction sensor. The control device calculates a set-point angle of the blades for each pitch motor, for example cyclically, and transmits it via a communication device to a control section of an inverter system, which in addition to the control section, also has a supply section for each pitch motor. The control section provides a position control of the blades in order to set a desired angular position in accordance with the set-point angle. To that end, the power section continuously inverts an electric current of for example 150 $A_{RSM}$ and briefly outputs a peak current of 210 $A_{RMS}$ in order to achieve a maximum torque of the pitch motors. The control device in this case monitors a precision of the blade adjustment and a state of the drive control and is able to influence them.

According to another embodiment, the at least one wind speed sensor and/or the at least one wind direction sensor is arranged in the region of at least one of the pitch motors. For example, the at least one wind speed sensor and/or the at least one wind direction sensor can be mounted on a rod, which is fastened to the pitch motor or in the region of the pitch motor and protrudes beyond an outer edge of the blade. In particular, the at least one wind speed sensor and/or the at least one wind direction sensor can be mounted on a distal end of the rod oriented away from the blade. As a result, the at least one wind speed sensor and/or the at least one wind direction sensor is preferably situated outside of an influence region of the blade in which air flow changes and turbulence caused by the blade could occur. Alternatively, or additionally, sensors such as a wind speed sensor and/or wind direction sensor as well as other signaling and measuring means can be positioned on a mast positioned centrally on the rotor hub and preferably protruding in the vertical direction beyond an upper end of the blades.

DESCRIPTION OF FIGURES

Exemplary embodiments of the invention will be described below based on the following figures. In the drawings:

FIG. 16 shows a schematic diagram of a positioning error of a pitch motor according to the invention over one control cycle at a.

IMPLEMENTATION OF THE INVENTION

For better comprehension of the present invention, reference is made to the drawings in the following. The drawings merely show exemplary embodiments of the subject-matter of the invention; as described above, features can be arbitrarily combined with one another or also omitted, depending on the respective requirements.

Figure 1:
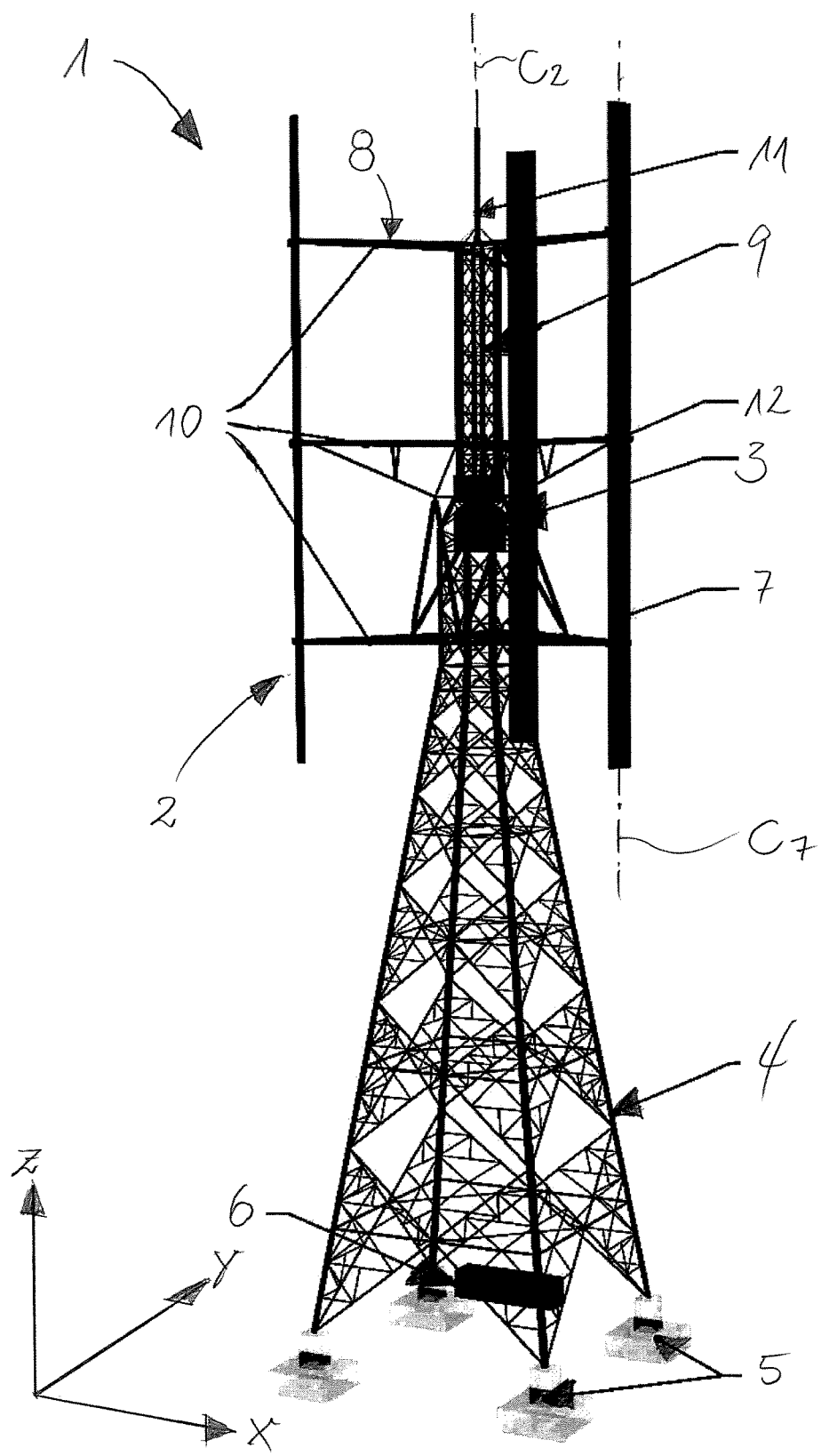
FIG. 1 shows a schematic perspective view of a vertical wind turbine according to the invention.

FIG. 1 shows a schematic perspective view of a vertical wind turbine according to the invention 1. The vertical wind turbine 1 extends along a longitudinal direction X, a transverse direction Y, and a vertical direction Z, which together define a Cartesian coordinate system. The vertical wind turbine 1 includes a rotor 2, a nacelle 3, a tower system 4, footings 5, and a container-like switchgear box 6.

The rotor 2 includes a plurality of vertical blades 7, which are fastened by means of a blade mount 8 to a rotor hub 9, which is supported in the nacelle 3 so that it is able to rotate around a rotor rotation axis $C_2$ that is vertically oriented, i.e. extends parallel to the vertical direction Z. The blade mount 8 includes rotor arms 10, which extend between the blades 7 and the rotor hub 9. A signaling and/or measuring mast 11 is positioned on the rotor hub 9 concentric to the rotor rotation axis $C_2$.

Figure 7:
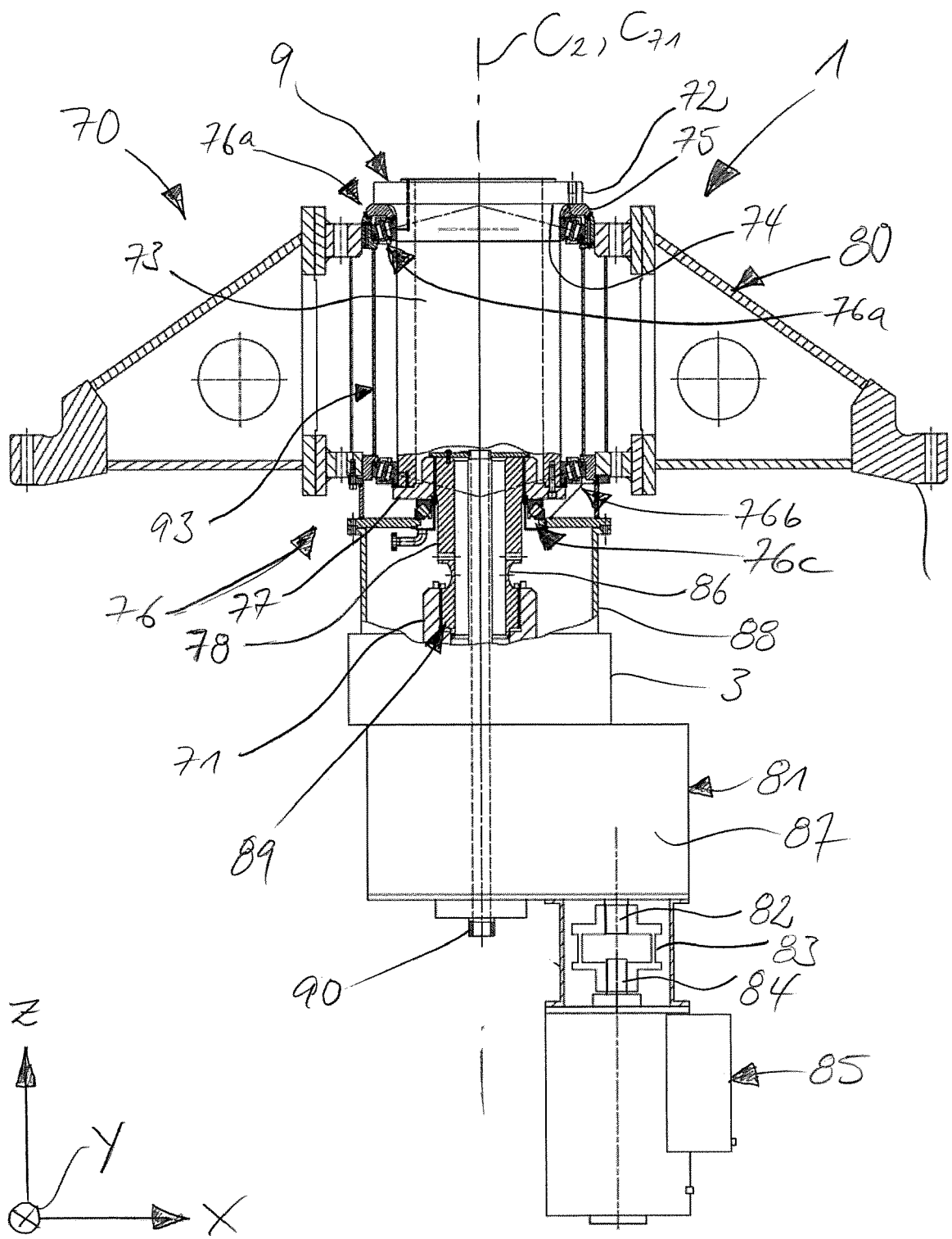
FIG. 7 shows a schematic cross-sectional view of a drive train of a vertical wind turbine according to the invention along a drive shaft of the drive train.

As a rule, the nacelle 3 is positioned at the top of the tower system 4, is cased-in in a sound-absorbing way, and contains a drive train of the vertical wind turbine 1 (generator, rotor bearing system, transmission, mechanical brake, and cooling/lubricating system, see FIG. 7). The tower system 4 is preferably embodied as a lattice mast tower. The footings 5 are preferably concrete footings, which absorb the load of the tower system 4, the nacelle 3, and the rotor 2. Other components such as electrical transformers, switch components, and a control device (see FIG. 11) of the vertical wind turbine 1 are preferably accommodated in the switchgear box 6.

The blades 7 are supported so that they are able to rotate around a blade rotation axis $C_7$, which likewise extends essentially parallel to the vertical direction Z. For the rotation of each of the blades 7 around its respective blade rotation axis $C_7$, they are each provided with at least one pitch drive 12. At least one of the rotor arms 10 is connected to the pitch drive 12, which can thus help absorb a load of the blade 7.

Figure 2:
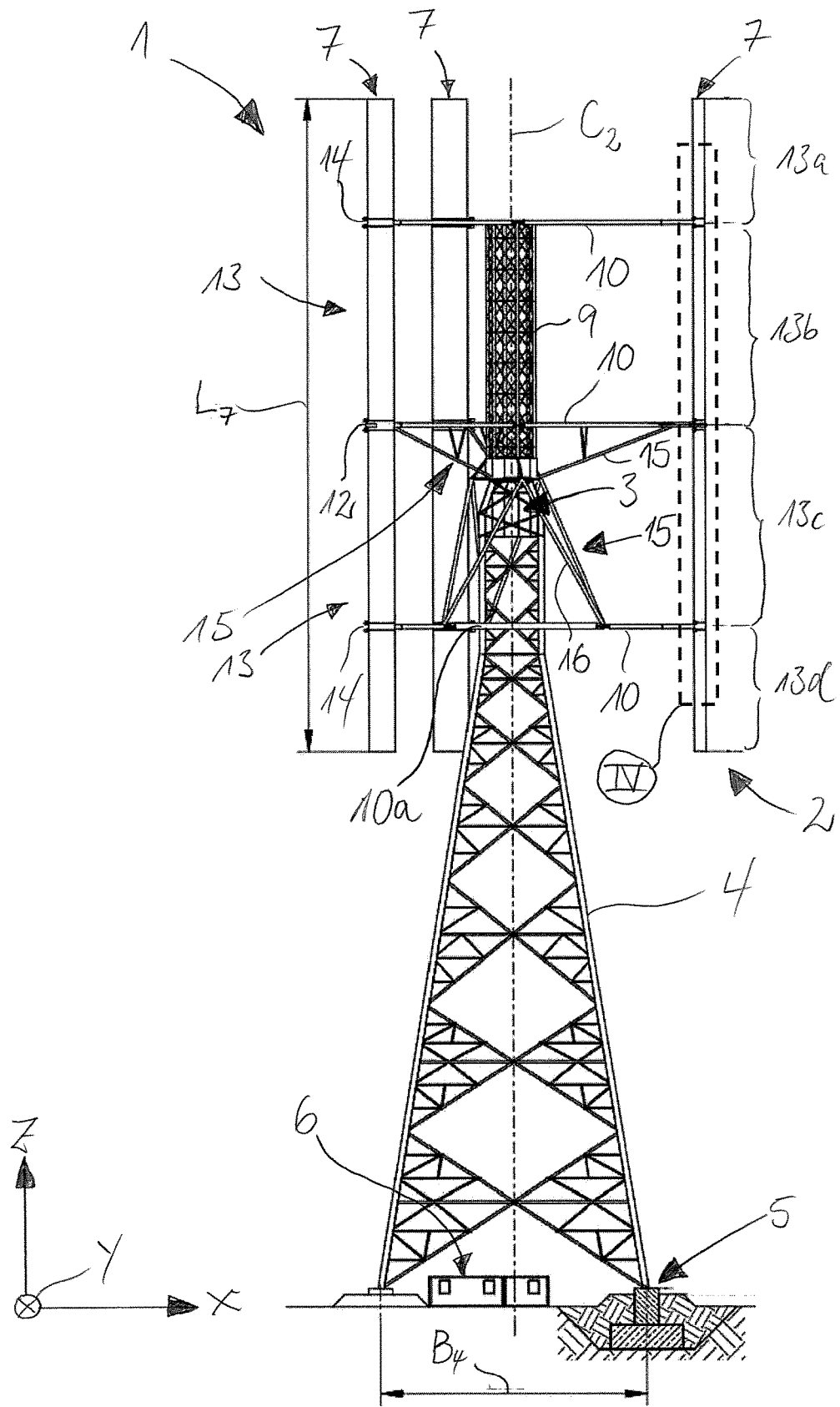
FIG. 2 shows a schematic side view of a vertical wind turbine according to the invention.

FIG. 2 shows a schematic front view of the vertical wind turbine 1. Here, it becomes clear that the blades 7 have a plurality of blade sections 13, namely an upper end section 13a, an upper middle section 13b, a lower middle section 13c, and a lower end section 13d. The pitch drive 12 is positioned between the upper middle section 13b and lower middle section 13c. Between the upper end section 13a and the middle end section 13b as well as between the lower middle section 13c and the lower end section 13d, an additional bearing point 14 is provided, respectively.

At the bearing points 14 between the upper end section 13a and upper middle section 13b and between the lower middle section 13c and the lower end section 13d, the blades 7 are each connected by means of one of the arms 10 to the rotor hub 9, which is designed only to transmit forces acting radially relative to the rotor rotation axis $C_2$, said forces therefore acting essentially in a horizontal plane, which is defined parallel to the longitudinal direction X and transverse direction Y. Since the lower ones of the arms 10 are positioned in the region of the lower middle section 13c and in the region of the lower end section 13d in the vertical direction Z below the nacelle 3 at the level of the tower system, the arms 10 are connected to the rotor hub 9 there by means of a transverse mount 15. The transverse mount 15 includes a plurality of transverse struts 16, which, between the arms 10 and a transverse connecting element 10a, are connected to the arms 10 and a transverse connecting element 10a and secure them.

At the pitch drive 12, between the upper middle section 13b and lower middle section 13c of the blades 7, forces are absorbed, which act both radially and in parallel to the rotor rotation axis $C_2$. Consequently, the entire weight load of the rotor 2 is absorbed at the pitch drive 12. In addition to the arms 10 horizontally connecting the pitch drive 12 to the rotor hub 9, a support structure 17 is configured to absorb the weight load of the rotor 2. The support structure 17 includes transverse struts 15 that support the arms 10, which are mounted to the pitch drive 12, by transferring loads beneath the arms 10 to the rotor hub 9 at a lower end section thereof.

Further, it is illustrated in FIG. 2 that the rotor hub 9 and the tower system 4 are each embodied as a tubular lattice structure. At the top of the tower system 4 embodied as a lattice mast tower, it tapers in the direction toward the nacelle 3 and at this location, absorbs all of the static and dynamic loads generated by the rotor 2. At the bottom of the tower system 4, the loads are transferred to the ground by means of the footings 5. The nacelle 3 can be accessed by means of a ladder, not shown, which will not be discussed in detail.

A maximum width $B_4$ of the tower system 4 measured parallel to the longitudinal direction X at the footings 5 is 22 m, for example. A length $L_7$ of the blades 7 measured parallel to the vertical direction Z is 54 m, for example. An overall height of the vertical wind turbine 1 measured to include a height of the footings extending above the ground is 105 m without the signaling and/or measuring mast 11, for example, and 110 m including the signaling and/or measuring mast 11.

Figure 3:
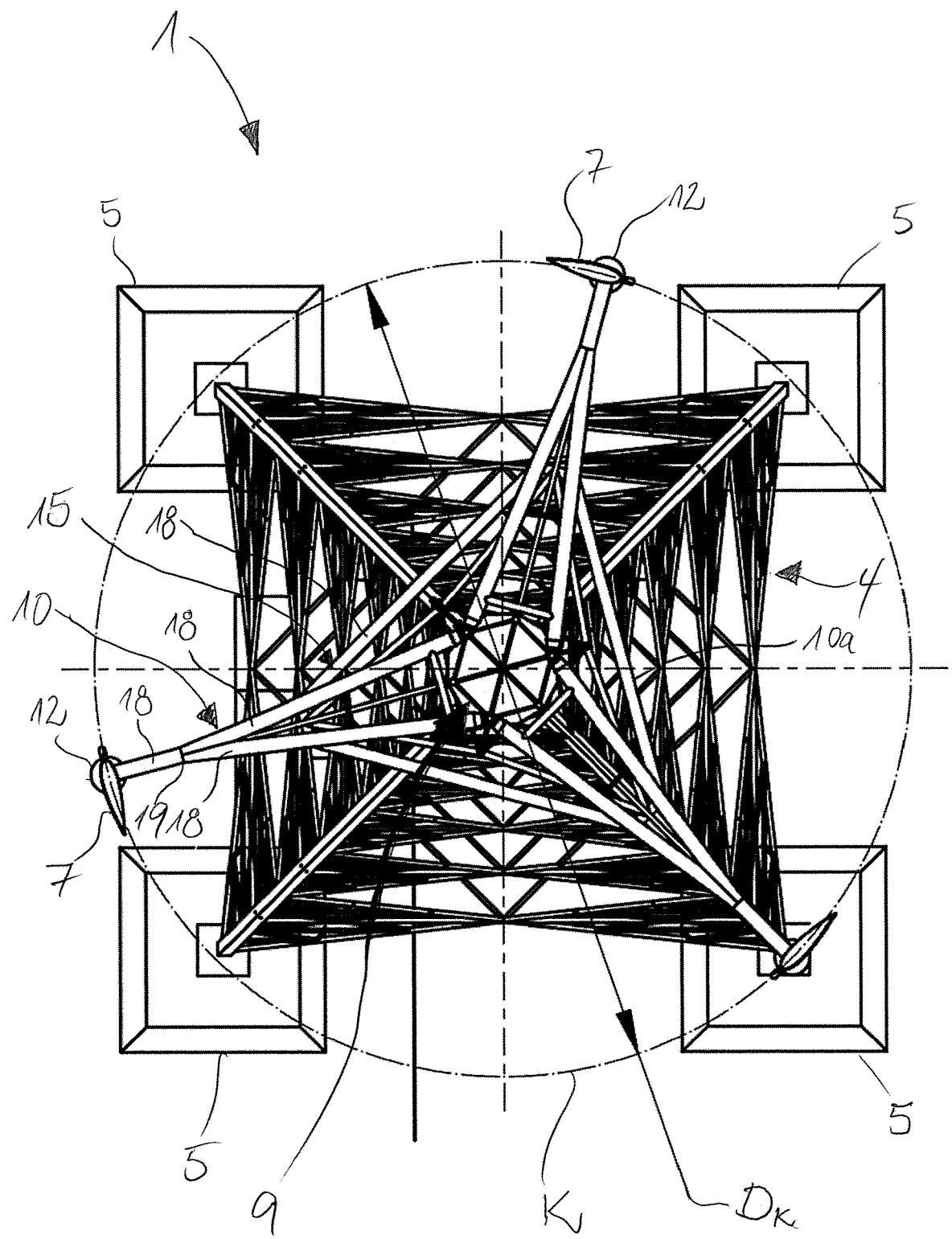
FIG. 3 shows a schematic top view of a vertical wind turbine according to the invention.

FIG. 3 shows a schematic top view of the vertical wind turbine 1. Here, it becomes clear that the blades 7 have a blade profile and move on a circular path K around the rotor rotation axis $C_2$. A diameter $D_K$ of the circular path K is 32 m, for example, and approximately corresponds to a maximum diameter of the tower system 4.

At their proximal ends, the arms 10 have two struts 18, ends of which are spaced horizontally apart from each other and are connected to the rotor hub 9. At their distal ends, the arms 10 are combined to form a single strut 18. At a connecting point 19, the struts 18 leading to the proximal end are merged in fork-like fashion with the strut 18 leading to the distal end, to which the pitch drive 12 is fastened. In addition, the transverse connecting element 10a of the transverse mount 15 is composed of three struts 18 that are connected to one another at their ends, which define an equilateral triangle in a projection along the vertical direction Z, which lies in a plane extending parallel to the longitudinal direction X and transverse direction Y.

Figure 4:
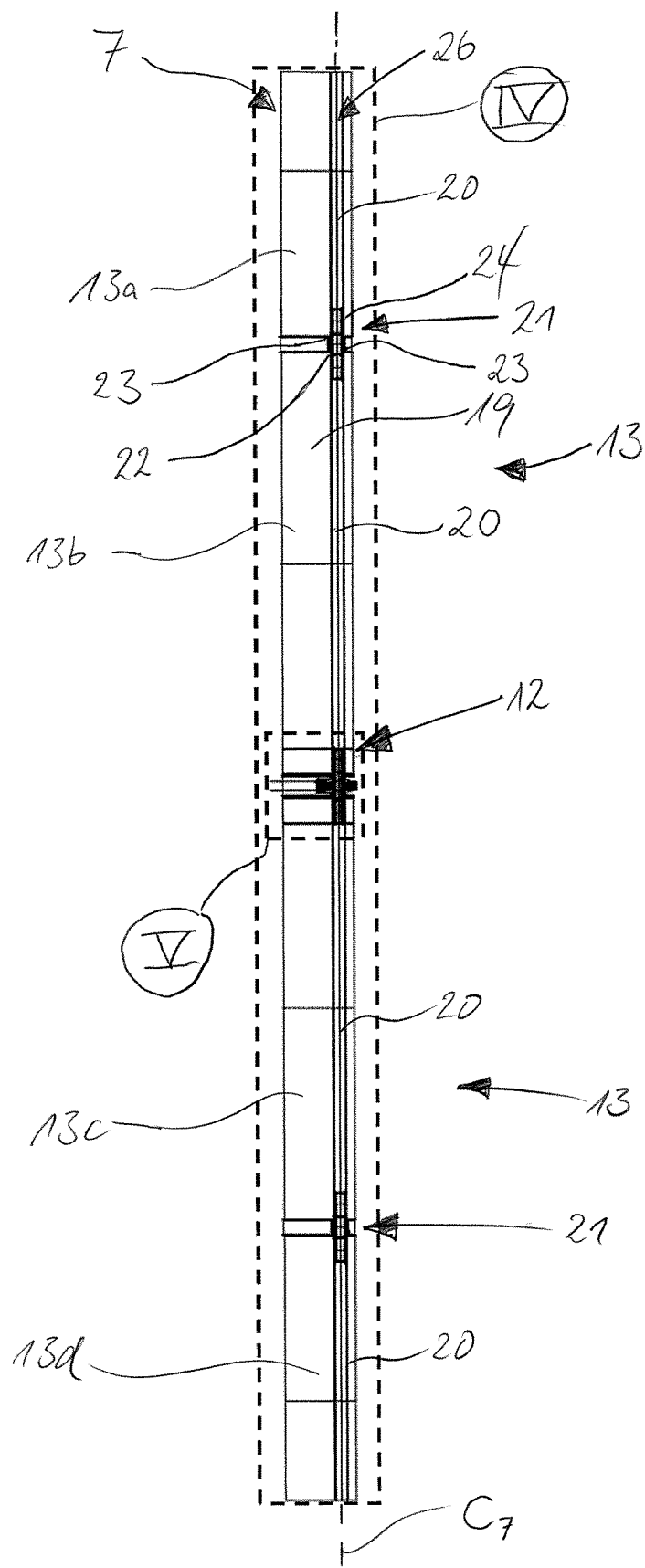
FIG. 4 shows a detail IV indicated in FIG. 2 of a blade of a vertical wind turbine according to the invention.

FIG. 4 a detail IV indicated in FIG. 2 of one of the blades 7 of the vertical wind turbine 1. The blade 7 has vanes 19, which are each fastened to an arbor 20 and is positioned concentric to the blade rotation axis $C_7$. Between the upper end section 13a and the upper middle section 13b and between the lower middle section 13c and the lower end section 13d, the blade 7 is respectively supported in a bearing unit 21 so that it is able to move in rotation around the blade axis $C_7$. The bearing unit 21 includes a bearing housing 22 in which two rolling bearings 23 are positioned, which enclose a bearing shaft 24 of the bearing unit 21, which shaft is embodied as a hollow shaft.

Between the upper middle section 13b and lower middle section 13c, the blade 7 is supported in the pitch drive 12 on a motor shaft 25 of the pitch drive 12. Together with the bearing shafts 24 and the motor shaft 25, the arbors 20 form a blade axis 26, which passes through the entire length of the blade 7 and to which the vanes 19 are firmly connected and supported such that they are held pivotably movable in rotating fashion. For example, the vanes 19 can be produced with a shell construction and be fastened to the arbor 20. To this end, the vanes 19 have an outer skin for absorbing torsional forces, an arbor flange for absorbing bending moments, an arbor strut, as well as ribs and stringers for preventing undulations or bulges in the outer skin (see FIG. 5).

Figure 5:
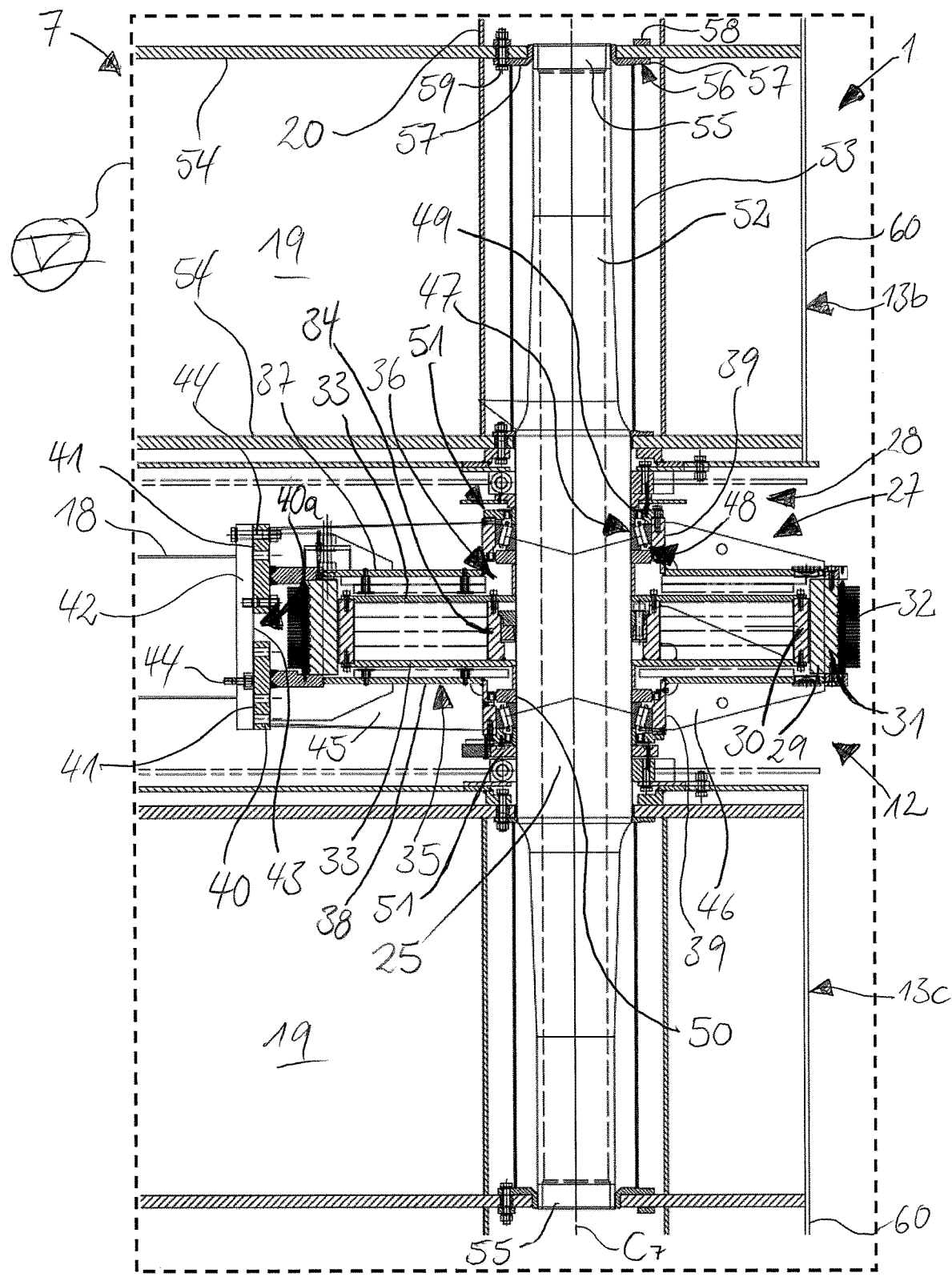
FIG. 5 shows a detail V indicated in FIG. 4 of a blade of a vertical wind turbine according to the invention with a pitch motor according to the invention in a schematic cross-sectional view along a rotation axis of the blade.

FIG. 5 shows a detail V indicated in FIG. 4 of the blade 7 with the pitch drive 12 in a schematic cross-sectional view along the blade rotation axis $C_7$. The pitch drive 12 has a pitch motor 27, which is positioned in a clearance 28 between the upper middle section 13b and lower middle section 13c of the blade 7. The pitch motor 27 is embodied as an electronically controlled, transmissionless, air-cooled torque motor and has a stator ring 29 and a rotor ring 30 that is circumferentially surrounded by the stator ring 29 and is spaced apart from it by a gap. A cooling body 31 with cooling fins 32 is fastened to an outer circumference surface of the stator ring 29 so as to be able to dissipate waste heat of the pitch motor 27.

The rotor ring 30 of the pitch motor 27 is mounted on two disk-shaped rims 33, which connect the rotor ring 30 in a rotationally coupled fashion to the essentially cylindrical motor shaft 25 by means of a clamping set 34. By means of the clamping set 34, a drive torque of the pitch motor 27—which is electromagnetically generated between the stator ring 29 and the rotor ring 30 and acts in a direction oriented around the blade rotation axis $C_7$—is transferred from the rotor ring 30 to the motor shaft 25.

A motor housing 35 of the pitch motor 27 forms a motor interior 36 in which the rotor ring 30 is accommodated. The motor housing 35 has a top 37 and a bottom 38, which extend in a disk shape along and essentially parallel to the rim 33. On their inner circumference sides, the top 37 and bottom 38 are each respectively connected to a bearing seat 39. On the outer circumference side, the top 37 and bottom 38 are connected to the stator ring 29 and cooling body 31 and, on a side of the pitch motor 27 facing the strut 18 that supports the blade 7, are connected to a motor flange 40 of the pitch drive 12.

The motor flange 40 provides end surfaces 41 at which the strut 18 is connected to the motor flange 40 by means of a mounting flange 42 connected to the rotor arm 10. The mounting flange 42 provides a counterpart end surface 43 that faces radially away from the rotor rotation axis $C_2$ in the direction toward the circular path K of the blades 7. The motor flange 40 and mounting flange 42 are connected to each other by means of connecting elements 44, which are embodied for example in the form of detachable connecting elements 44 such as bolted connections. Between the end surfaces 41 of the motor flange 40, there is an open space 40a in order to provide sufficient space in the region of the cooling fins 32 for heat dissipation or more precisely stated, to prevent a heat buildup.

Reinforcing ribs 45 extend between the bearing seat 39 and motor flange 40 in order to be able to transmit the static and dynamic loads, which originate from the blade 7, from the bearing seat 39 via the motor housing 35 to the motor flange 40 with as little distortion of the motor housing 35 as possible. In the remaining sections of the motor housing 35, support ribs 46 are provided, which extend radially outward from the annular bearing seat 39 along the cover 37 and bottom 38 in order to stiffen them and to prevent distortions of the motor housing 35.

Reinforcing ribs 45 and support ribs 46 are each advantageously integrally joined, for example by means of welding, to the top 37, bottom 38, bearing seat 39, and motor flange 40 or to the top 37, bottom 38, and bearing seat 39; they extend into and away from the upward direction Z and away from the top 37 and bottom 38 in strut-like fashion. In addition to their reinforcing action, the reinforcing ribs 45 and support ribs 46 also contribute to the cooling of the pitch motor 37 through heat dissipation via the motor housing 35.

Respective motor bearings 47 are positioned between the two bearing seats 39 and the motor shaft 25. For example, the motor bearings 47 are embodied in the form of spherical roller bearings. They transmit high radial forces from the blades 7 to the struts 18 of the rotor arms 10 and also stiffen the rotor 2 as a whole. In order to protect the motor bearings 47 from harmful environmental influences, the motor bearings 47 are each accommodated in a bearing receiving chamber 48, which, to the greatest extent possible, is hermetically sealed by means of sealing elements 49.

The sealing elements 49 seal the bearing receiving chamber 48, both in relation to the motor interior 36 and in relation to the surroundings of the vertical wind turbine 1. Toward the motor interior 36, the bearing receiving chamber 48 is sealed by means of inner rings 50, which—resting against the motor bearing 47 and, on the outer circumference side, against the sealing element 49 in the axial direction of the blade 7, both in and away from the upward direction Z, respectively—isolate the bearing receiving chamber 48 from the motor interior 36. The bearing receiving chamber 48 is sealed in relation to the surroundings of the vertical wind turbine 1 by means of outer rings 41, which respectively rest against the outside of the bearing seat 39 and enclose the sealing element 49 on the inner circumference.

At its ends oriented toward the vanes 19, the motor shaft 25 is connected to a transition section 52 or transitions into it in integral fashion. The transition section 52 tapers as it extends away from the pitch drive 12 and is accommodated in a vane axis section 53, which rotationally couples the transition section 52 to ribs 54 of the blade 7 in adapter fashion, which ribs extent transversely to the blade rotation axis $C_7$. To that end, connecting ends 55 of the transition section 52 extending in the direction along the blade rotation axis $C_7$ are accommodated in fixing elements 56, which enclose the connecting ends 55 at least in a by force-fit and have flange sections 57 oriented radially away from the connecting ends 55, on which positive-fit elements 58 and other connecting elements 59 are provided, for example likewise detachable ones in the form of bolt connections, which create a positive-fit and/or force-fit engagement the fixing elements 56 and the respective rib 54.

The motor shaft 25, transition section 52, vane axis section 53, and arbor 20 extend coaxially to one another. In this case, the arbor 20 encompasses the vane axis section 53, which in turn encompasses the transition section 52. The ribs 54 are rotationally coupled to the arbor 20 and support an outer skin 60 of the blade 7.

Figure 6:
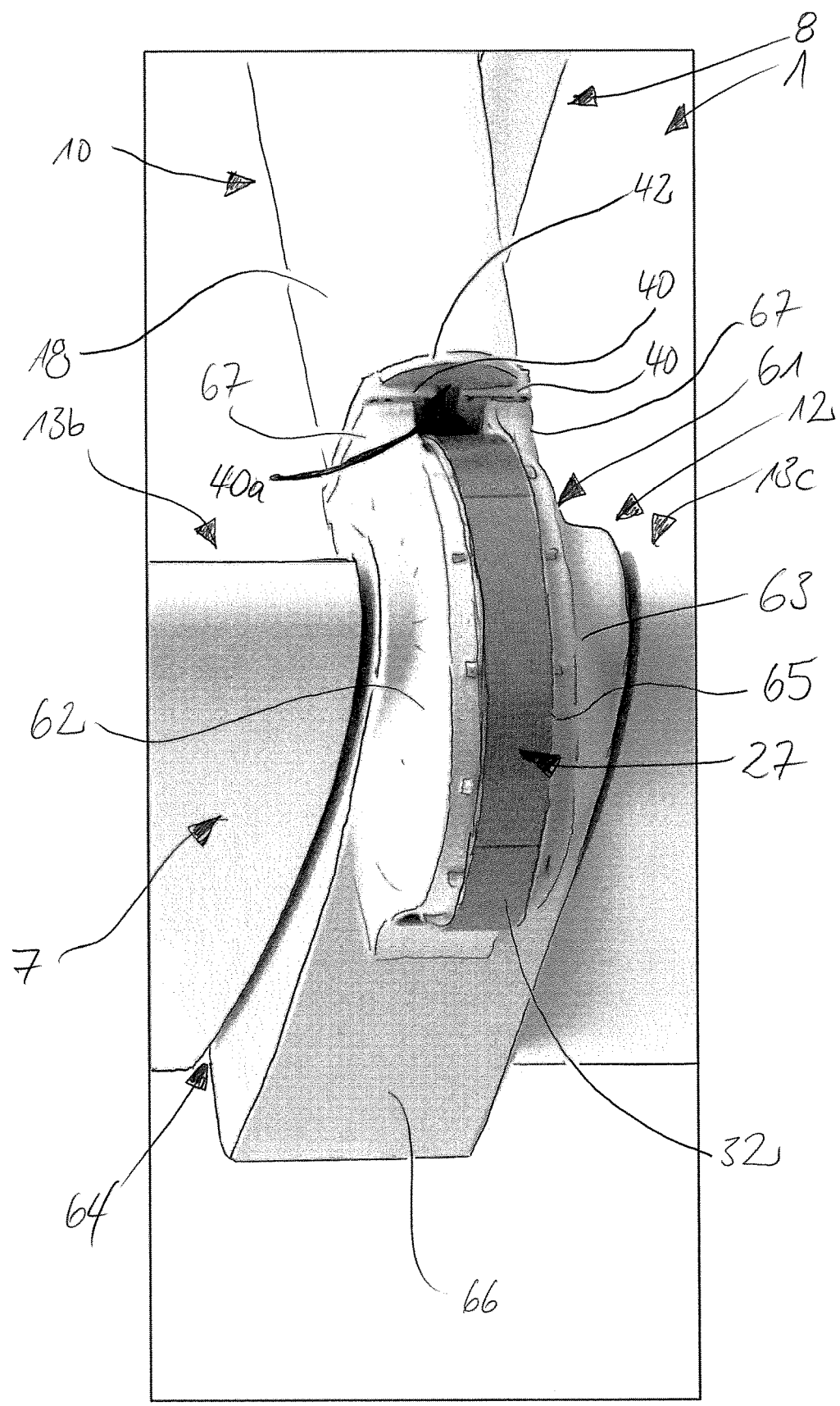
FIG. 6 shows a schematic perspective view of an aerodynamically covered pitch motor of a vertical wind turbine according to the invention.

FIG. 6 shows a schematic perspective view of the pitch drive 12 in which the pitch motor 27 is provided with an aerodynamic cover in the form of a casing 61. The casing 61 has a upper shell 62 and a lower shell 63, which enclose the pitch motor 27 in the vicinity of the top 37 and bottom 38 like a cowling and thus cover the top 37 and bottom 38 together with the reinforcement 45 and support ribs 46, thus minimizing the size of a drive gap 64 that is formed between the pitch drive 12 and the blade 7 and minimizing the accompanying losses in pressure and output that occur at such a gap. Between the upper shell 62 and lower shell 63, an annular gap-shaped cooling opening 65 is formed, which axially surrounds the cooling body 31 and through which the cooling fins 32 freely extend so that with ambient air circulating unhindered around them, they can give off the waste heat of the pitch motor 27 to the surroundings of the vertical wind turbine 1.

The drive gap 64 is further reduced in that the casing 61 provides an extension 66, which is formed in accordance with aerodynamic aspects, which adjoins the upper shell 62 and lower shell 63, and an outer contour of which in a projection along the blade rotation axis $C_7$ essentially corresponds to a blade profile of the blades 7. In the direction toward the rotor arm 10, the casing 61 is provided with end caps 67, which rest flush against the motor flange 40 and an outer diameter of which, at least in some places, is adapted to an outer diameter of the mounting flange 42. An outer contour of the mounting flange 42 is in turn adapted to an outer contour of the strut 18. As a result, the end caps 67, the motor flange 40, the connecting flange 42, and the strut 18 transition into one another with outer contours that are as flush with one another as possible and there is an aerodynamically advantageous transition between the pitch drive 12 and the blade mount 8.

FIG. 7 shows a schematic cross-sectional view of a drive train 70 of the vertical wind turbine 1 along a drive shaft 71 of the drive train 70, a drive rotation axis $C_{71}$ of which extends coaxial to the rotor rotation axis $C_2$. The rotor hub 9 has a pedestal 72 that forms a stud 73, which likewise extends coaxial to the drive rotation axis $C_{71}$ and rotor rotation axis $C_2$. At the place where the pedestal 72 tapers toward the stud 73, a hub shoulder 74, which points away from the upward direction Z, is formed on the pedestal 72 and rests on a transition ring 75, which in turn rests axially in a direction oriented away from the upward direction Z on a first rotor bearing 76a, which constitutes a part of a rotor bearing system 76.

In addition to the first rotor bearing 76a, the rotor bearing system 76 also includes a second rotor bearing 76b and a third rotor bearing 76c. The first and second rotor bearings 76a, 76b are embodied for example as prestressed conical roller bearings and transmit radial loads resulting from wind loads to the tower system 4. For this purpose, the first and second rotor bearings 76a, 76b are mounted on a rotor shaft 78 by means of a separate bearing bush 77. The part of the rotor bearing system 76 comprising the first and second rotor bearings 76a, 76b is assembled in an axially free-floating fashion in a hub connection 79 that constitutes a machine support and therefore remains free of vertical loads. The third rotor bearing 76c absorbs the vertical loads of the rotor 2 and thus essentially its weight force and for this purpose, is advantageously embodied in the form of an axial spherical roller bearing, which introduces the vertical loads directly into the nacelle 3.

Below the nacelle 3, a transmission 81 of the vertical wind turbine 1 is arranged in which a rotor speed of the rotor shaft 78 is converted into a generator rotation speed at an output shaft 82 of the transmission 81. A clutch unit 83, for example in the form of a double-Catalan, torsionally rigid steel disk clutch, connects the output shaft 82 in a torque-transmitting fashion to a generator shaft 84 of a generator 85, for example a synchronous machine with permanent magnets, in order to produce electrical current, in this case for example with a maximum power of 750 kW. The clutch unit 83 prevents a redundant dimensioning of bearing forces. To limit the torque, the rotor shaft 78 is provided with an intended break point 86 (for example with a nominal torque of 500 kNm; an intended break moment of 1000 kNm; and a permissible transmission peak torque of 1500 kNm).

The transmission 81 converts the low rotor speed according to the invention into a high generator rotation speed. For example, a transmission step-up factor i amounts to roughly 75. A transmission housing 87 of the transmission 81 is rigidly screw-mounted to the hub connection by means of a flange bell 88. This results in a direct feedback of the high operating torque. Between the rotor shaft 78 and drive train 70, there is a double-cardan, spherically ground double-tooth clutch 89, which transmits the torque of the rotor 2 to the transmission 81 without redundant dimensioning of bearing forces.

In addition, a pitch pipe 90 passes through the transmission 81 coaxial to the rotor shaft 78 and serves as a feed-through for control wires and power cables for the pitch drive 12. The pitch pipe 12 is driven to a point above the intended break point 86 in the coupling 89 by being rotationally coupled to the rotor 2. Thus, after a breakage occurs at the intended break point 86 and after the system subsequently coasts to a stop, the cables and lines for transmitting signals and/or power (see FIG. 11) are not twisted and therefore remain intact.

Figure 8:
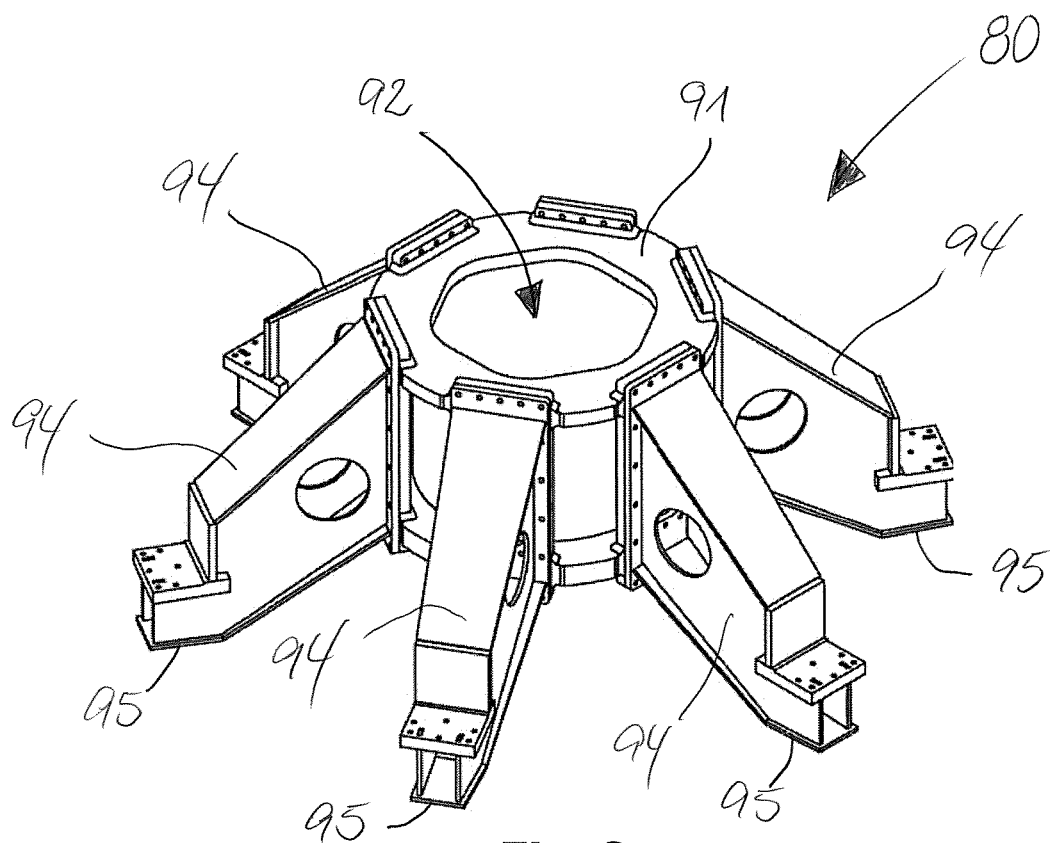
FIG. 8 shows a schematic perspective view of a first embodiment according to the invention of a hub connection of a vertical wind turbine according to the invention.

FIG. 8 shows a schematic perspective view of a first embodiment according to the invention of the hub connection 80 of the vertical wind turbine 1. The hub connection 80 includes a cylindrical, drum-like integrally formed base body 91, which provides a feed-through 92 for accommodating a shaft bearing unit 93 (see FIG. 7) of the drive train 70. Supporting feet 94 are fastened equidistantly to the outer circumference side of the base body 91 and extend out radially from it. The supporting feet 94 each provide a horizontally oriented rest 95 for mounting the hub connection 80 onto the tower system 4. The supporting feet 94 can for example be composed of welded-together plates and be integrally connected to the base body 91 by welding or be flange-mounted to it; the base body can in turn also be composed of welded-together plates.

Figure 9:
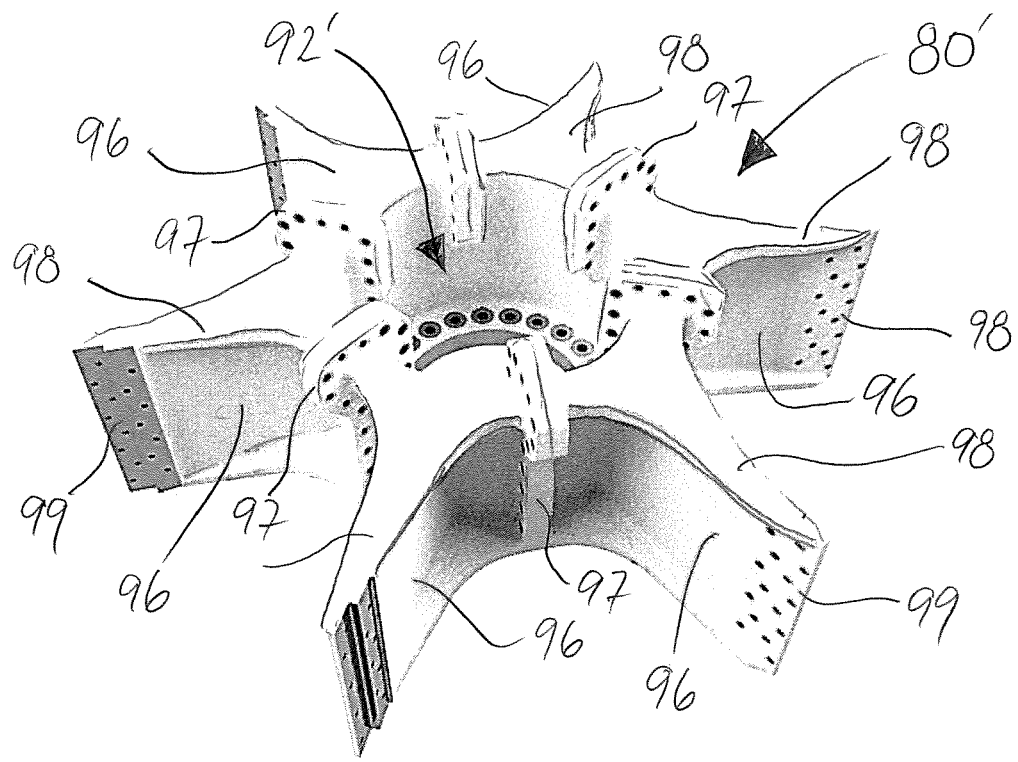
FIG. 9 shows a perspective view of another embodiment according to the invention of a hub connection of a proper vertical wind turbine.

FIG. 9 shows a schematic perspective view of a second embodiment of a hub connection 80'. By contrast with the embodiment of the hub connection 80 shown in FIG. 8, the hub connection 80' is composed of a plurality of identically shaped segments 96, which each provide two flange ends 97, at which they are connected to one another enclosing a circle and thus combine to form a feed-through 92' for accommodating the shaft bearing unit 93. Each of the segments 96 constitutes a supporting arm 98. At the distal end of each supporting arm 98 oriented away from the feed-through 92', a vertically extending supporting tab 99 is formed, which lies in a respective radial plane relative thereto for being mounted onto the tower system 4. For example, the segments 96 can be cast individually, which can help to reduce manufacturing costs, particularly in mass production and can help to adapt material thicknesses of the segments 96 in high-stress points and can also help to provide rounded regions on it in order to reduce stress concentrations, for example by having the flange ends 97 transition into the supporting arms 98 by forming a curved profile.

Figure 10:
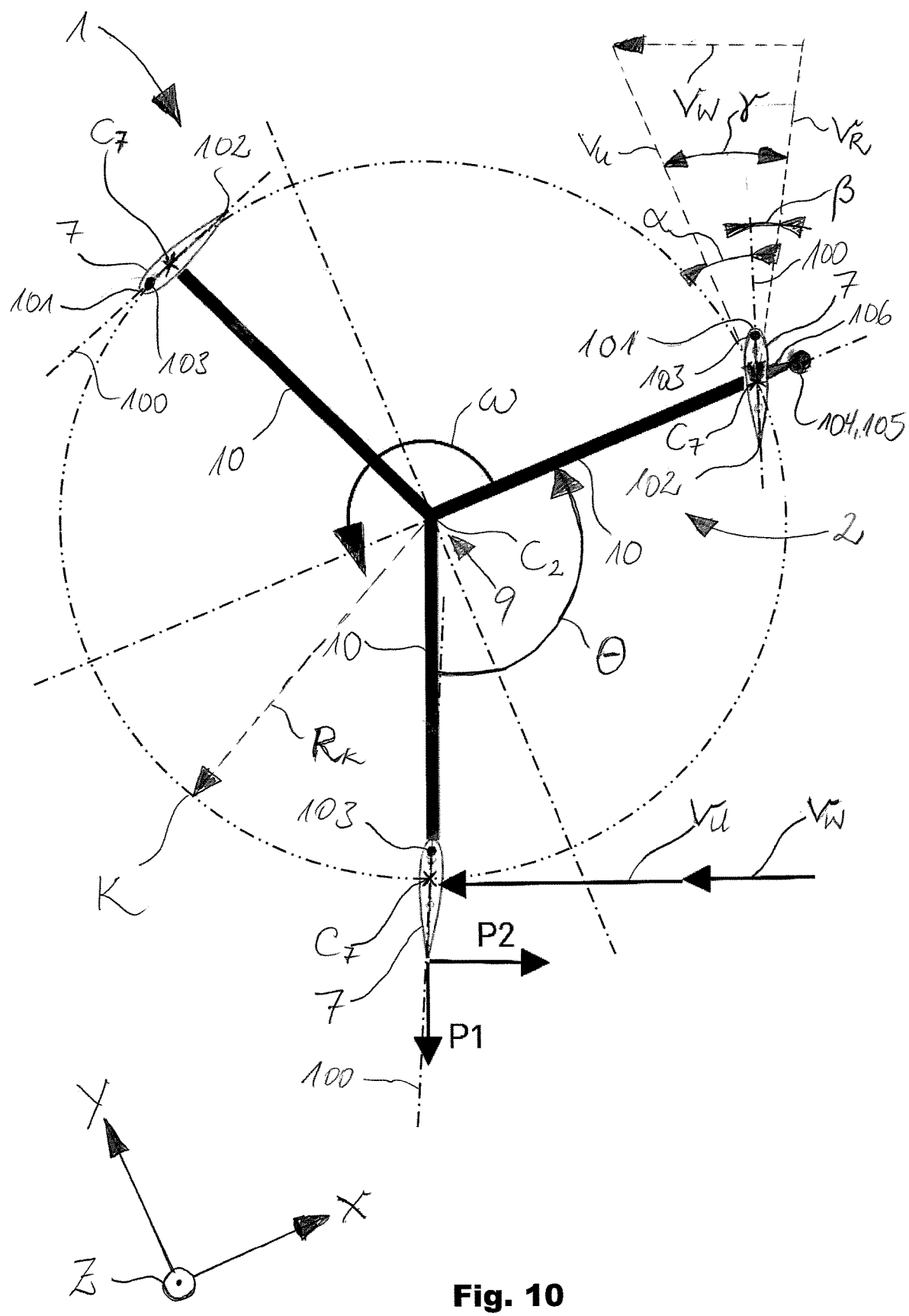
FIG. 10 shows a schematic top view of a vertical wind turbine according to the invention during operation to illustrate angular positions and force conditions at blades of the vertical wind turbine.

FIG. 10 shows a schematic top view of the vertical wind turbine 1 to illustrate angular positions and force conditions at the blades 7 during the operation of the vertical wind turbine 1. During the operation of the vertical wind turbine 1, the wind flows against the blades 7 at a wind speed $v_W$. The rotation of the rotor 2 around the rotor rotation axis $C_2$ produces an angular velocity ω of the rotor 2, which, multiplied by a radius $R_K$ of the circular path K that corresponds to half of the diameter $D_K$ of the circular path K, yields a circumferential speed $v_U$ of the blades 7 along the circular path K according to equation (1) below:

$$v_U = \omega \times R_K \quad (1)$$

A difference between the wind speed $v_W$ and the circumferential speed $v_U$ yields a relative speed $v_R$ of the blade 7 moving along the circular path K in relation to the wind according to equation (2) below:

$$v_R = v_W - v_U \quad (2)$$

Between the vectors of the circumferential speed $v_U$ and the relative speed $v_R$ at the blade 7, there is an angle of incidence γ, which is calculated according to equation (3) below from a sum of a relative angle of incidence or angle of attack α and a gradient angle or pitch angle β:

$$\gamma = \alpha + \beta \quad (3)$$

The angle of attack α is respectively measured between the vector of the circumferential speed $v_U$ and a chord line 100 of the blades 7, which extends in a straight line between a leading edge 101 and a trailing edge 102. The pitch angle β is measured between the vector of the relative speed $v_R$ and the chord line 100. The blades 7 have a symmetrical blade profile, by means of which the blade chord forms a plane of symmetry of the blades 7 or their vanes.

Through the rotation of the rotor 2 around the rotor rotation axis $C_2$, the relative speed $v_R$ is a function of an azimuth angle θ of the rotor 2, which is measured for example for the respective rotor arm 10 starting from a zero point at a position 90° from the wind direction, facing into the wind and rotating relative to a main axis of the vertical wind turbine 1. A tangent of the angle of incidence γ is calculated as a function of the wind speed $v_W$, the relative speed $v_R$, and the azimuth angle θ or as a function of a tip speed ratio λ and the azimuth angle θ according to equation (4) below:

$$\tan \gamma = \frac{v_W \sin \theta}{v_R + v_W \cos \theta} = \frac{\sin \theta}{\lambda \cos \theta}, \quad (4)$$

where the tip speed ratio λ in turn, according to equation (5) below, corresponds to a ratio of the circumferential speed $v_U$ to the wind speed $v_W$ and according to the invention, is to be set as optimally as possible and kept constant by means of the respective pitch drive 12 or more precisely, its pitch motor 27, in accordance with the respective wind conditions with varying pitch angles β in order to maximize an energy yield or performance of a vertical wind turbine 1 according to the invention:

$$\lambda = \frac{v_U}{v_W} \quad (5)$$

In order to minimize an adjusting torque of the pitch drive 12—which is required to vary the pitch angle β by rotating the blade 7 around the rotor rotation axis $C_7$—, it is advantageous if a static center of gravity of the blade 7 lies on or as close as possible to the rotor rotation axis $C_7$. For example, the rotor rotation axis $C_7$ is positioned on the chord line 100 at 20 to 23%, preferably 21.5%, of a rotor blade depth measured from the leading edge 101. In order to position the center of gravity on the rotor rotation axis $C_7$, a counterweight 103 is positioned in the region of the leading edge 101 in the blade 7. For example, the counterweight 103 is composed of rod segments, preferably of a round steel rod with diameters of between 60 and 100 mm, most preferably 80 mm. The rod segments are fastened to the ribs 54. The segments can be advantageously connected to one another in an electrically conductive fashion. As a result, the counterweight 103 can perform a double function in that it also serves as a lightning rod.

In addition, the vertical wind turbine 1 has at least one wind speed sensor 104 and/or wind direction sensor 105. The wind speed sensor 104 and/or wind direction sensor 105 is positioned at the upper end of the signaling and/or measuring mast 11 and/or on at least one of the blades 7 or on all of the blades 7. The wind speed sensor 104 and/or wind direction sensor 105 is preferably fastened to the blade 7 in the region of the pitch drive 12 because wind speeds and/or directions measured there are highly relevant for the control of the pitch drive 12.

In order to keep the wind speed sensor 104 and/or wind direction sensor 105 outside of air turbulence caused by the blade 7, the wind speed sensor 104 and/or wind direction sensor 105 is positioned at the distal end of a rod 106, which is fastened to the blade 7 or pitch drive 12 and, oriented radially away from the rotor rotation axis $C_2$, protrudes beyond the circular path K into a region in the vicinity of the vertical wind turbine 1, which lies as far as possible outside of air flow boundary layers that are formed around the rotor 2 and its components, i.e. largely outside of the influence range of the blade 7.

Figure 11:
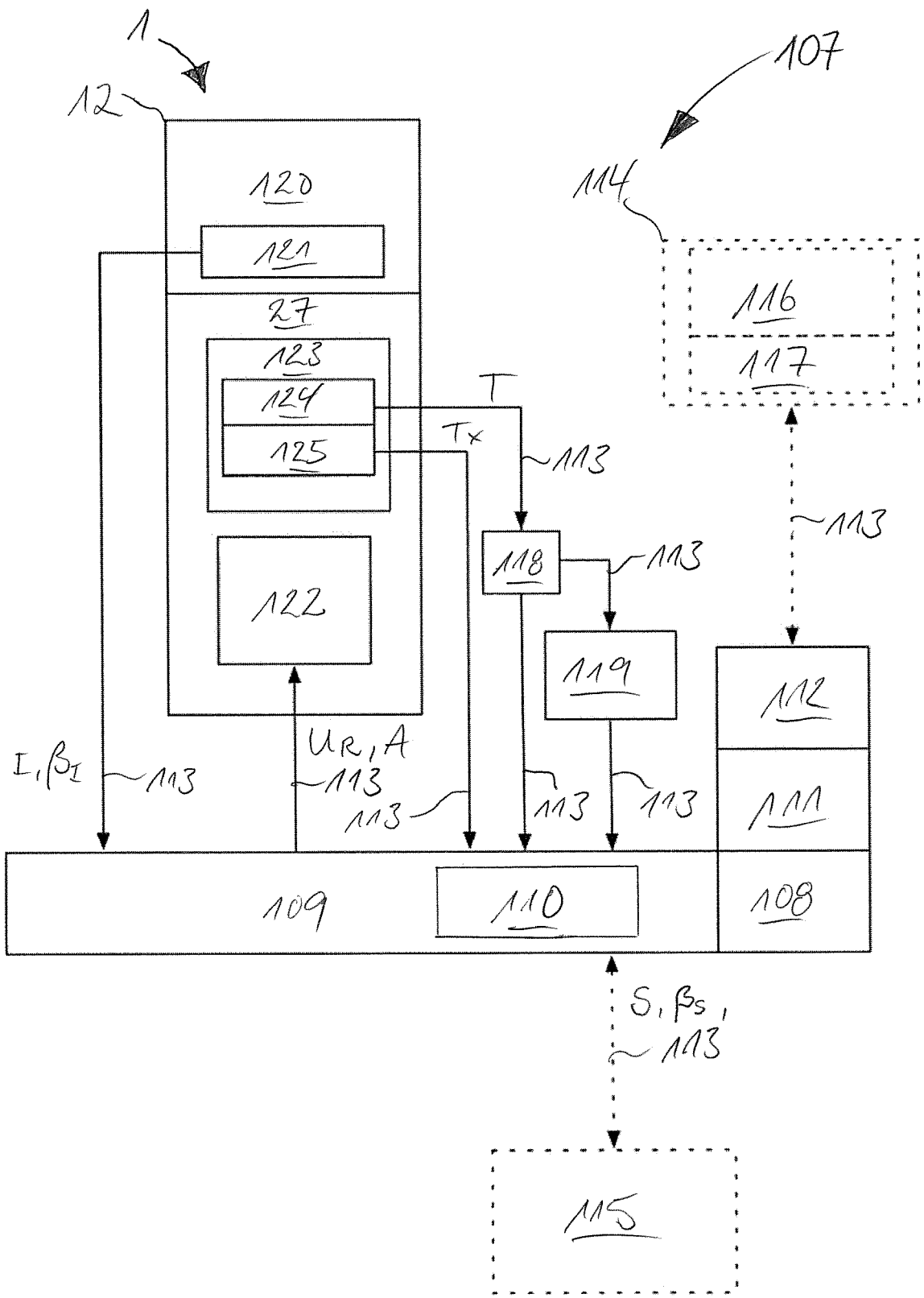
FIG. 11 shows a schematic diagram to illustrate the function of a control device according to the invention belonging to a vertical wind turbine according to the invention.

FIG. 11 shows a schematic diagram to illustrate the function of a control device according to the invention 107 of the vertical wind turbine 1. The control device 107 includes a supply unit 108, which is on the one hand connected to a motor control unit 109 that includes a power section 110 and on the other hand, is connected to a choke 111 and a filter 112 in order to ensure the most malfunction-free and error-free power supply possible. For example, the power unit 110 is embodied as an inverter.

Via lines 113 for transmitting signals and/or power, the motor control unit 109 is connected to the pitch drive 12, a power supply unit 114, and a control unit 115 for monitoring and controlling the vertical wind turbine 1. The power supply unit 114 includes a main power supply unit 116 and an auxiliary power supply unit 117, the latter ensuring an emergency power supply to the control device 107 if the main power supply unit 116 fails or is not available.

In addition, the control device 107 includes a motor protection unit 118 and a data transmission unit 119. The pitch drive 12 also includes a rotary position transducer 120 with a position sensor 121 for monitoring a rotation position of the rotor ring 30 relative to the stator ring 29. The pitch motor 27 also includes a motor unit 122, which includes at least the stator ring 29 and the rotor ring 30, and a temperature measuring unit 123, which has a first temperature sensor 124 and at least one other temperature sensor 125. For example, the first temperature sensor 124 is embodied as a resistance-dependent temperature sensor (KTY), whereas the other temperature sensor 125 is embodied for example as a temperature sensor with a positive temperature coefficient (PTC).

During operation of the vertical wind turbine 1, the power section 110 of the motor control unit 109 of the control device 107 inverts—for example continuously—a current that is required to drive the pitch motor 27. For example, the power element 110 can output a continuous current of 100 to 200, preferably 150 $A_{RMS}$, and produce a peak current of 200 to 250, preferably 210 $A_{RMS}$, so that it is possible to quickly obtain a maximum torque of the pitch motor 27. The control unit 115 cyclically calculates a set-point value S for the adjustment of each of the blades 7, for example in the form of a set-point pitch angle $\beta_S$, and supplies it via the corresponding line 113 to the motor control unit 109.

With the aid of the rotary position transducer 120, an actual value I such as an actual pitch angle $\beta_I$ is determined and is transmitted via the corresponding line 113 to the motor control unit 109. Based on the set-point value S and the actual value I, the motor control unit 109 determines a differential value d, for example an angular deviation δ, and based on it, derives a control value U, for example in the form of a control current A, which is transmitted to the respective drive unit 12 and/or the motor unit 122 of the pitch motor 27. Correspondingly, the motor control unit 109 adjusts the pitch angle β according to the invention with the least possible angular deviation δ.

With the aid of the temperature sensor 124 and the other temperature sensor 125, the temperature measuring unit 123 detects a first temperature measurement value T and at least one other temperature measurement value $T_x$, which are determined for redundancy reasons and/or for different uses. Thus, the temperature measurement value T is transmitted via one of the lines 113 to the motor protection unit 118. The motor protection unit 118 compares the temperature measurement value T to a temperature limit value and if the temperature limit value is exceeded, can transmit an alarm signal via the corresponding line 113 to the motor control unit 109, where preventive measures for protecting the respective pitch drive 12 are initiated, for example an emergency shut-off or interruption of the power supply. At the same time, the motor protection unit 118 can use the corresponding line 113 to transmit temperature values for relaying temperature data to the motor control unit 109 and/or control unit 115 and the data transmission unit 119.

The other temperature measurement value $T_x$ is transmitted via corresponding lines 113 directly to the motor control unit 109 in order to keep a temperature of the drive unit 12 and the components thereof within the scope of a predetermined or specified operating temperature. In the motor control unit 109, immediate temperature control measures can be initiated, whereas in the control unit 115, longer-term temperature control measures can be carried out. Thus, with the aid of the alarm signal sent by the motor protection unit 118 on the basis of the temperature measurement value T, a rapid temperature control can be carried out in order to protect the drive unit 12, whereas the temperature data that are related to the control unit 115 can be used to perform a long-term temperature control and through the direct relaying of the other temperature measurement value $T_x$ to the motor control unit 109, a middle-term temperature control is possible.

The control device 107 is configured and set up to implement the following ten operating modes M0 to M9 of the vertical wind turbine 1:

M0: The vertical wind turbine 1 is switched off in a zeroth operating mode M0.

M1: Start-up readiness of the vertical wind turbine 1 from still air in a first operating mode M1 at wind speeds below a starting wind speed $v_1$, i.e. with $0<v_W<v_1$, for example where $v_1=3$ m/s;

M2: Start-up of the vertical wind turbine 1 in a second operating mode M2 at wind speeds above the starting wind speed $v_1$ and below a nominal wind speed $v_2$, i.e. with $v_1 \leq v_W < v_2$, for example where $v_2=12$ m/s;

M3: Switching of the vertical wind turbine 1 from a resistance mode where $\lambda \leq 1$ starting into a fast mode where $\lambda > 1$ in a third operating mode M3 or start-up mode at wind speeds above the starting wind speed $v_1$ and below a first cut-out wind speed $v_3$, i.e. with $v_1 \leq v_W < v_3$, for example with a minimum rotation speed of the rotor of 4 [rpm] and a first cut-out wind speed $v_3=20$ m/s (average measured over 10 minutes);

M4: Shut-down of the vertical wind turbine 1 in a fourth operating mode M4 at wind speeds above the first cut-out wind speed $v_3$ or a further cut-out wind speed $v_4$, i.e. with $v_W > v_3$ or $v_W > v_4$, respectively, for example where $v_4=30$ m/s (average measured over 3 seconds);

M5: Restarting of the vertical wind turbine 1 in a fifth operating mode M5 when the wind speed falls below a restart wind speed $v_5$ after a shut-down in the fourth operating mode M4, for example where $v_5=18$ m/s;

M6: Operation of the vertical wind turbine 1 at a constant tip speed ratio λ in a sixth operating mode M6 or partial load mode for wind speeds above the starting wind speed $v_1$ and below a nominal wind speed $v_2$, i.e. with $v_1 \leq v_W \leq v_2$, for example with a tip speed ratio λ between 2 and 2.6, preferably between 2.2 and 2.4, most preferably 2.3 at a nominal wind speed $v_2$ of 12 m/s and a circumferential speed of the blades 7 on the circular path K of $v_U=27.6$ m/s;

M7: Operation of the vertical wind turbine 1 with a variable tip speed ratio λ in a seventh operating mode M7 or nominal operation mode or also full-load operation with a nominal speed of the rotor of for example 16.5 [rpm] at wind speeds above the nominal wind speed $v_2$ and below the first cut-out wind speed $v_3$ or the further cut-out wind speed $v_4$, i.e. in a nominal wind speed range with $v_2 < v_W \leq v_3$ or $v_2 < v_W \leq v_4$; for example with a tip speed ratio λ between 1 and 1.8, preferably between 1.3 and 1.5, most preferably 1.38 at a first cut-out wind speed $v_3$ of 20 m/s;

M8: Emergency shut-down of the vertical wind turbine 1 in an eighth operating mode M8 at extreme wind speed increase gradients $dv_W/dt$ greater than a shut-down gradient of the wind speed; and M9: Switching-off of the vertical wind turbine 1 in a ninth operating mode M9 to switch the vertical wind turbine 1 into the zeroth operating mode from one of the operating modes M1 to M8.

Figure 12:
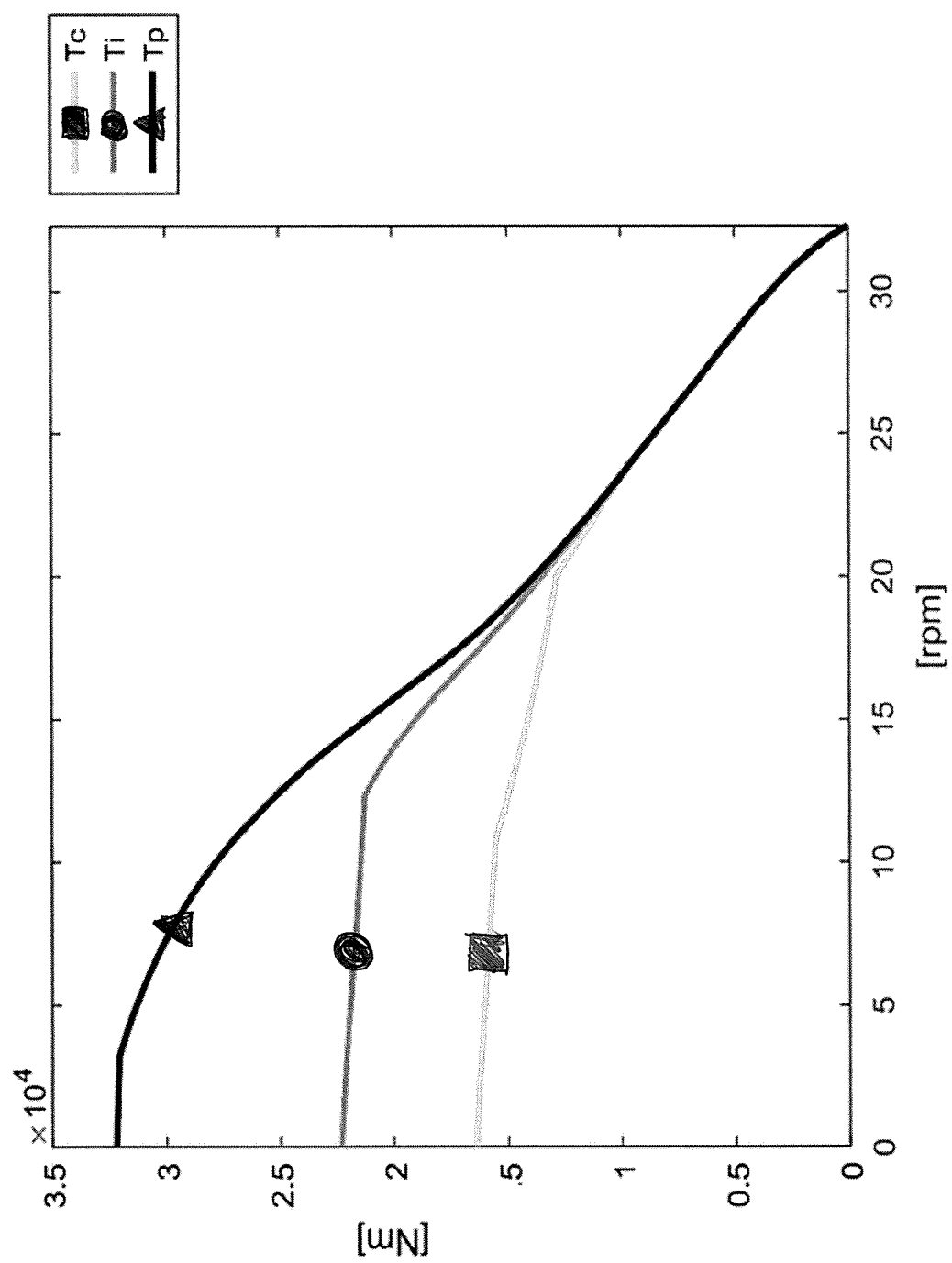
FIG. 12 shows a schematic diagram with a sample torque characteristic curve of a pitch motor according to the invention for a vertical wind turbine according to the invention.

FIG. 12 shows a schematic diagram of a sample torque characteristic curve of the pitch motor 27. The diagram shows a maximum torque Tp, a nominal torque Ti, and continuous torque Tc of the pitch motor 27 over the rotation speed of the pitch motor 27. The pitch motor 27 can rapidly produce the maximum torque Tp in order to spontaneously, i.e. within a very short, extremely limited time, perform a quick adjustment of the respective blade 7. When the maximum torque Tp is exceeded, i.e. when an overload occurs, the motor slips and is thus inherently safe, i.e. no damage to the motor occurs. The nominal torque Ti can be used continuously until a temperature limit value is exceeded. As a rule, the continuous torque Tc is available on an ongoing basis and does not lead to temperature limit values being exceeded.

Figure 13:
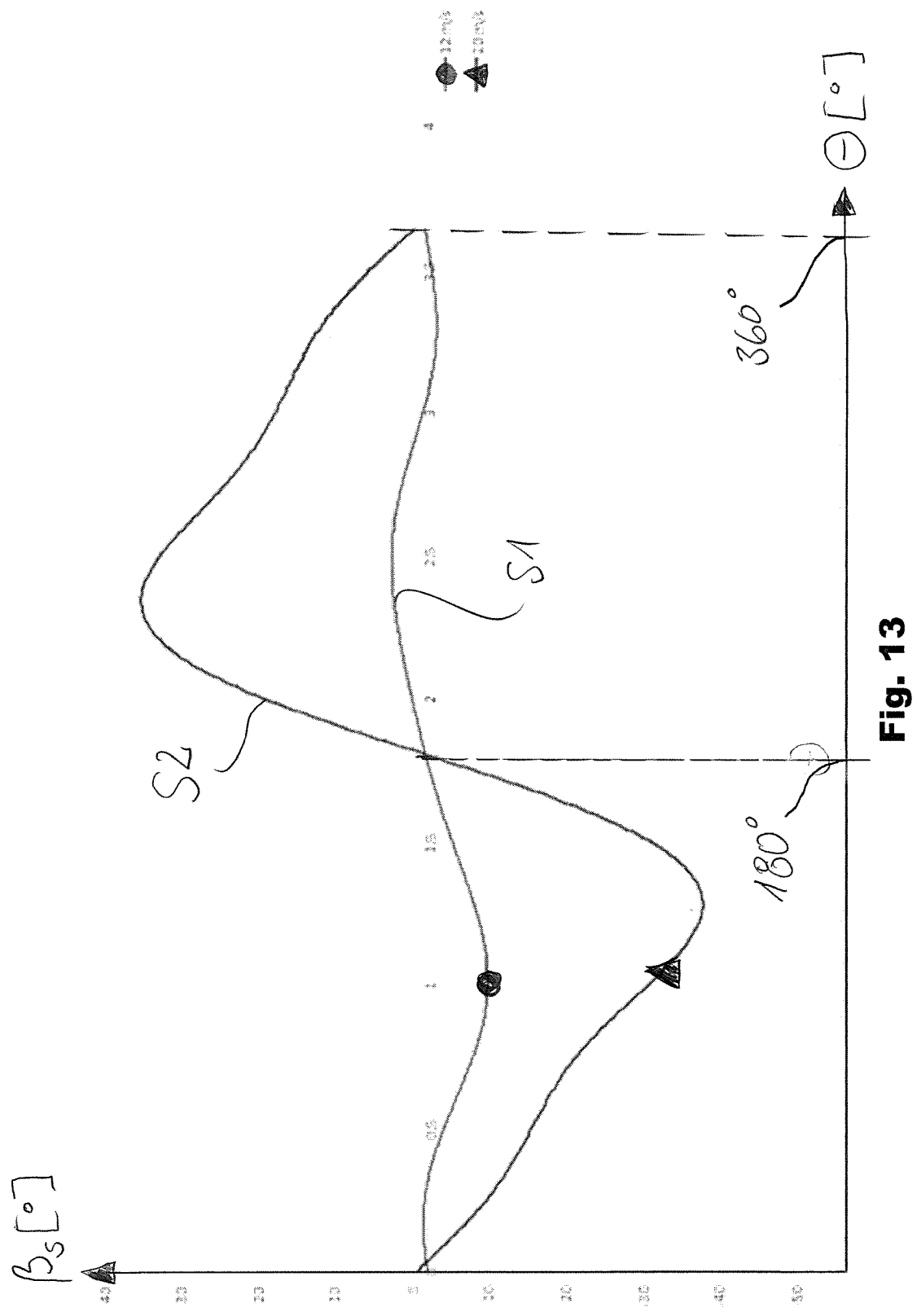
FIG. 13 shows a schematic diagram with sample cam disks for controlling a pitch motor for a vertical wind turbine according to the invention.

FIG. 13 shows a schematic diagram with sample cam disks for controlling the pitch motor 12, namely a first cam disk S1, which is provided for example for the nominal wind speed $v_2$ of for example 12 m/s, and a further cam disk S2, which is provided for the first cut-out wind speed $v_3$ of for example 20 m/s. Between these two wind speeds, for example a nominal-load operation or full-load operation of the vertical wind turbine 1 in the seventh operating mode M7 is provided, in which the rotor 2 rotates at a nominal speed and the generator 85 outputs its nominal power. For each cam disk S1, S2, the set-point value S of the pitch angle β is represented as the set-point pitch angle $β_S$ in dependence of the azimuth angle θ.

At the nominal wind speed $v_2$, the set-point pitch angle $β_S$ at an azimuth angle θ of 0° is less than 0°, for example in the range from −2 to −3°. On the way to an azimuth angle θ of 90°, the set-point pitch angle $β_S$ first passes through a local maximum of −2 to −3° at an azimuth angle θ of approx. 20° and then passes through an inflection point between −3 and −4° at an azimuth angle θ of approx. 20° until the set-point pitch angle $β_S$ at an azimuth angle θ of approx. 50° reaches an absolute minimum of approx. −10°.

At an azimuth angle θ of 180°, the set-point pitch angle $β_S$ for the nominal wind speed $v_2$ is once again approx. 2 to −3° and then, at an azimuth angle θ of approx. 200°, reaches a value of 0°. At an azimuth angle θ of approx. 250°, the set-point pitch angle $β_S$ for the nominal wind speed $v_2$ reaches its absolute maximum of approx. 2 to 3° and then at an azimuth angle θ of approx. 290° once again reaches a value of 0° and at approximately the same time, passes through an inflection point. Then the set-point pitch angle $β_S$ passes through a local minimum of approx. −3 to −4° at an azimuth angle θ of approx. 330° and finally, at an azimuth angle θ of approx. 360°, returns once again to its initial range of −2 to −3°.

At the first cut-out wind speed $v_3$, the set-point pitch angle $β_S$ at an azimuth angle θ of 0° is less than 0°, for example in the range from −1 to −2°, and is thus less than the set-point pitch angle $β_S$ at an azimuth angle θ of 0° at a nominal wind speed $v_2$. On the way to an azimuth angle θ of 90°, without a local maximum, the set-point pitch angle $β_S$ passes through an inflection point between −14 and −16° at an azimuth angle θ of approx. 45° until, at an azimuth angle θ of approx. 100°, the set-point pitch angle $β_S$ passes through another inflection point at approx. −30° and then, at an azimuth angle θ of approx. 100°, reaches an absolute minimum of approx. −37° to −38°.

At an azimuth angle θ of 180°, the set-point pitch angle $β_S$ for the first cut-out wind speed $v_3$, like the set-point pitch angle $β_S$ for the nominal wind speed $v_2$, is approx. −2 to −3° and then, at an azimuth angle θ of approx. 170°, reaches a value of 0° earlier than the set-point pitch angle $β_S$ for the nominal wind speed $v_2$. At an azimuth angle θ of approx. 230 to 240°, the set-point pitch angle $β_S$ reaches its absolute maximum of approx. 35° and then, at an azimuth angle θ of approx. 270°, reaches an inflection point at approx. 25°. Then the set-point pitch angle $β_S$ passes through an inflection point at approx. 15° at an azimuth angle θ of approx. 320° and finally, at an azimuth angle θ of approx. 360°, returns once again to its initial range of −1 to −2°.

Figure 14:
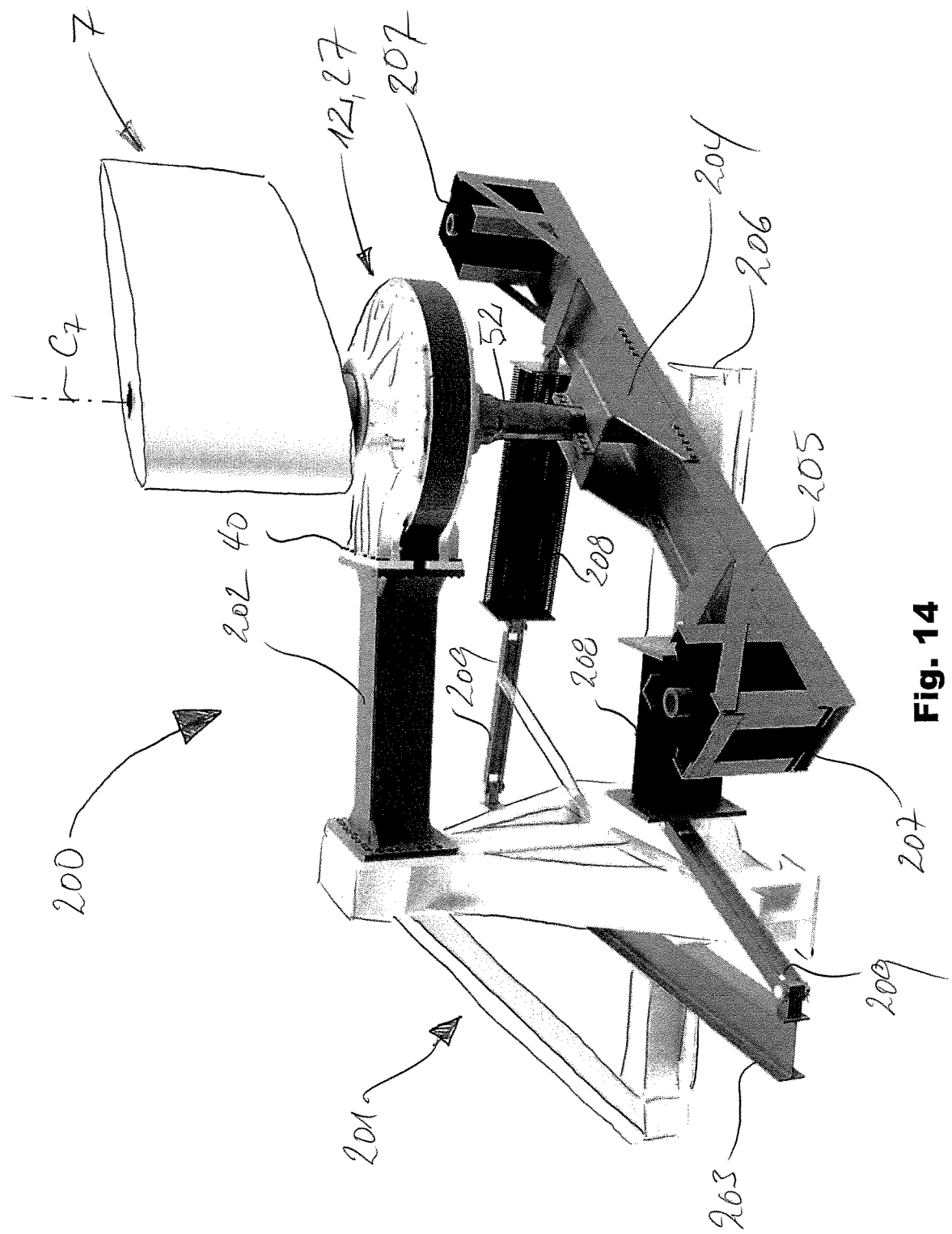
FIG. 14 shows a schematic perspective view of a test bench for determining a positioning error of a pitch motor of a vertical wind turbine according to the invention.

FIG. 14 shows a schematic perspective view of a test bench 200 for determining a positioning error of the pitch motor 27 of the vertical wind turbine 1. On the test bench 200, a frame structure 201 is provided, to which is attached a holding arm 202 for holding the pitch drive 12 or pitch motor 27 and a transverse arm 203. The pitch drive 12 together with a section of the blade 7 is mounted on the holding arm 202 of the test bench 200 by means of the motor flange 40 similarly to how it would be mounted to the rotor arm 10 of the vertical wind turbine 1. The transition section 52 protruding out from the pitch motor 27 is accommodated in a shaft mount 204 of the test bench 200 so that it is able to rotate around the blade rotation axis $C_7$.

The shaft mount 204 is positioned in the middle of a swing arm 205, which is likewise held so that it is able to rotate around the blade rotation axis $C_7$ in an extension 206 of the frame structure 201. A weight 207 is secured at each of the two ends of the swing arm 205 oriented away from the blade rotation axis $C_7$. The weights 207 simulate a total mass of the blade 7. In addition, the ends of the swing arm 205 are connected to the transverse arm 203 by means of spring elements 208 in the form of coil spring packs and articulating linkages 209 fastened thereto. The spring elements 208 simulate wind forces.

Figure 15:
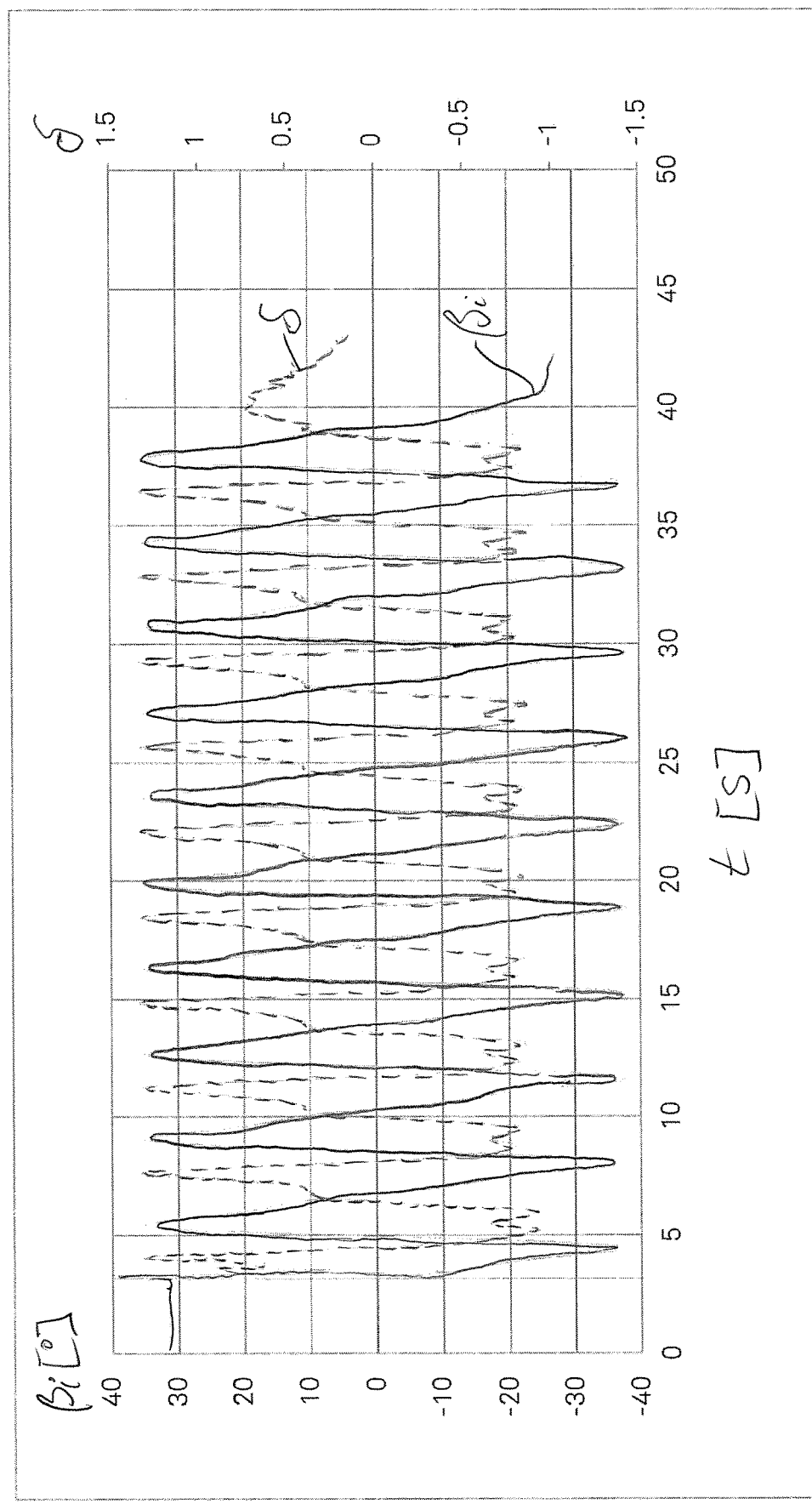
FIG. 15 shows a schematic diagram of a positioning error of a pitch motor according to the invention, which has been determined by means of the test bench shown in FIG. 14, over a plurality of control cycles.

FIG. 15 shows a schematic diagram of a positioning error, which has been determined by means of the test bench 200 shown in FIG. 14, in the form an angular deviation δ of the pitch motor 27 in ° over time tin seconds for a plurality of control cycles during which a simulated azimuth angle θ passes through a respective rotor rotation of 360°. After an initial transient response, which does not occur in the vertical wind turbine 1, the angular deviation δ reaches an absolute value of less than 1.5° for set-point pitch angles $β_S$ with absolute values of at most 30 to 40°.

Figure 16:
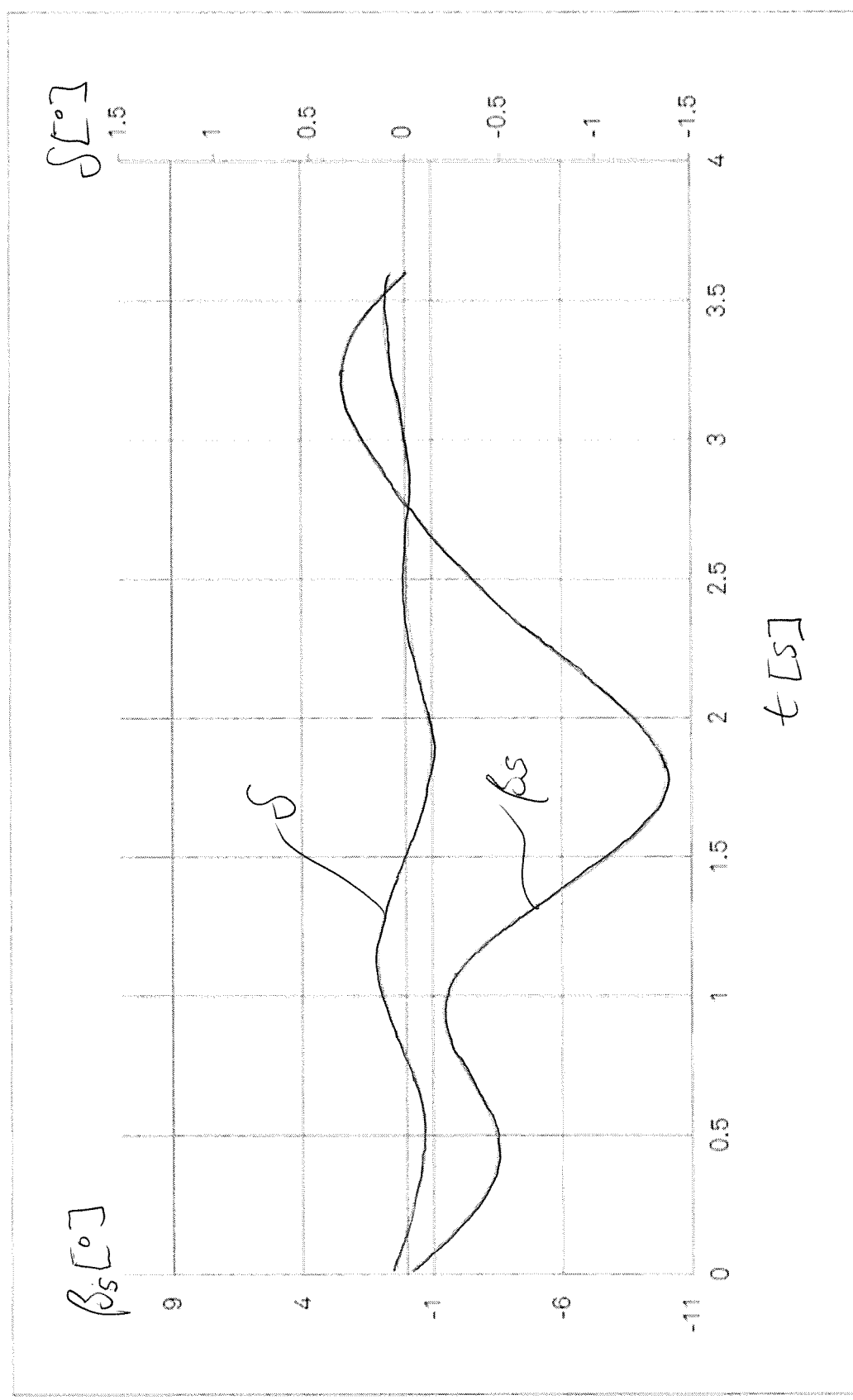

FIG. 16 shows a schematic diagram of a positioning error of the pitch motor 27 in the form of the angular deviation δ in ° over time tin seconds over one control cycle for the nominal wind speed $v_2$. At a nominal wind speed $v_2$, the angular deviation δ has an absolute value of always less than 0.5° and reaches a maximum absolute value of approx. 0.25° after respective local and absolute minima and maxima of the set-point pitch angle $β_S$. In the vicinity of the inflection points of the set-point pitch angle $β_I$, the angular deviation δ fluctuates around 0°.

Figure 17:
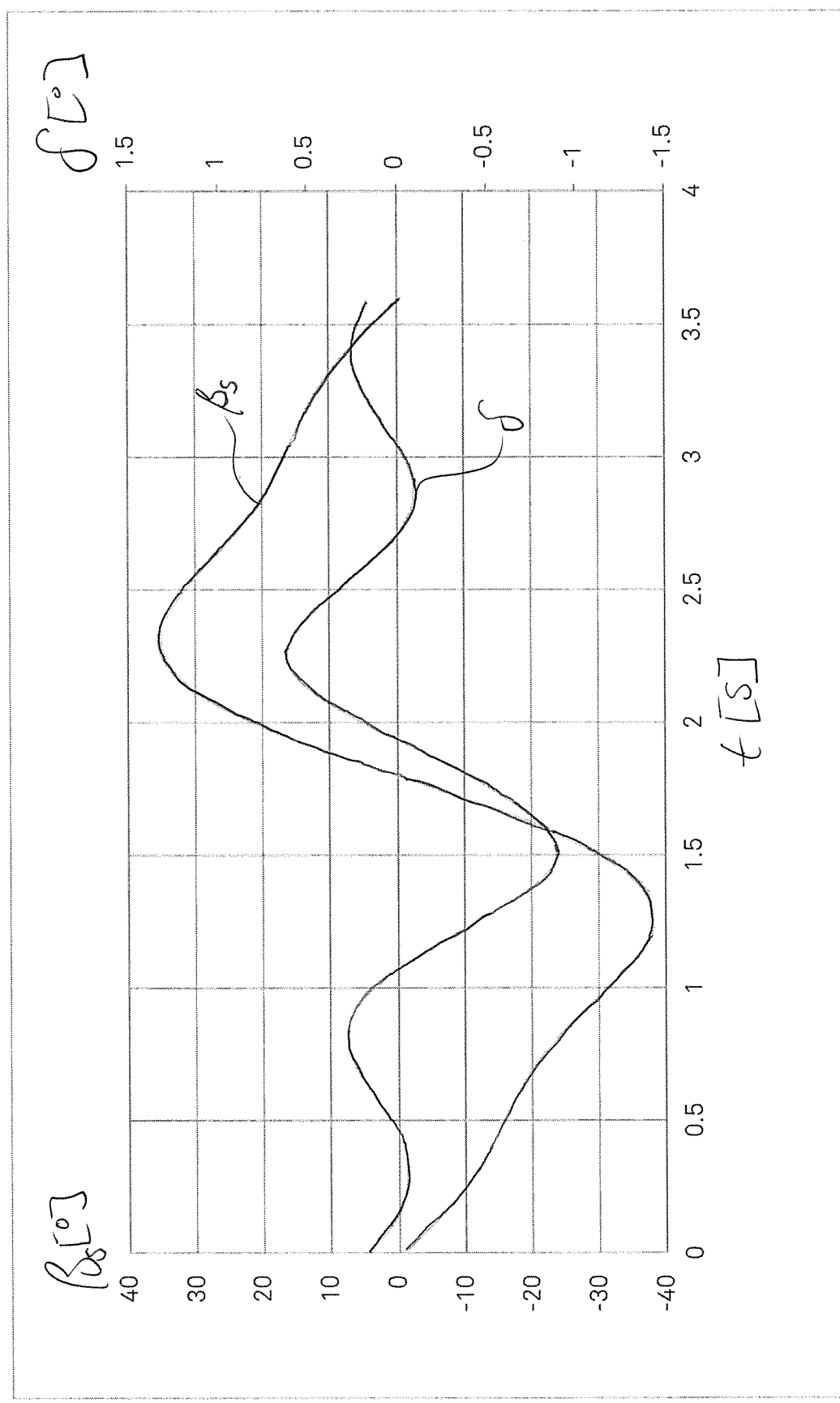
FIG. 17 shows a schematic diagram of a positioning error of a pitch motor according to the invention over one control cycle at a cut-out wind speed.

FIG. 17 shows a schematic diagram of a positioning error of the pitch motor 27 in the form of the angular deviation δ in ° over time tin seconds over one control cycle for the first cut-out wind speed $v_3$. At the first cut-out wind speed $v_3$, the angular deviation δ has an absolute value of always less than 1.5° and reaches a maximum absolute value of approx. 1.45° after respective local and absolute minima of the set-point pitch angle $β_S$ and reaches a maximum of approx. 0.6 at local and absolute maxima thereof. In the vicinity of the inflection points of the set-point pitch angle $β_I$, the angular deviation δ likewise fluctuates around 0°. In general, therefore, the angular deviation δ turns out to be slightly higher at the first cut-out wind speed $v_3$ than at the nominal wind speed $v_2$.

Deviations from the above-described embodiments and implementation examples are possible within the scope of the concept of the invention. A person skilled in the art will therefore recognize that characteristic values and parameters of the vertical wind turbine 1 and its components as well as values for controlling the components are dependent on the dimensions of the vertical wind turbine 1 and are subject to change. Consequently, all of the above-mentioned absolute values of physical variables, e.g. wind speeds, are chiefly indicated for a design instance of the vertical wind turbine 1 described here, with a nominal power of 750 KW, a nominal height of 105 m, a rotor diameter of 32 m, a length of the blades 7 of 54 m, a height of the blades 7 over the ground of 51 m, a height of the middle of the blades 7 above the ground of 78 m, a survival wind speed of 59.5 m/s, and an annual average speed of 8.5 m/s and can be varied in accordance with other design instances, which can in turn result in deviations of relative physical variables such as tip speed ratios.

Also within the scope of the concept of the invention, unlike in the exemplary embodiment described here, more than two pitch drives 12 can be provided for each blade 7 or, for example, one pitch drive 12 can be provided for each blade section 13. In other words, two respective blades 7 or blade sections 13 can be provided, which are driven in a vertically separate way from each other. Thus for example, two pitch drives 12 can be positioned between two blades 7 or blade sections 13 and, as an upper and lower pitch drive 12, can be respectively associated with an upper and lower of the two blades 7 or blade sections 13. The upper blade or blade section 13 can thus be rotated around its blade rotation axis $C_7$ independently of the lower blade 7 or blade section 13.

Each of the two blades 7 or blade sections 13 can be associated with at least one wind speed sensor 104 and/or wind direction sensor 105. The at least one wind speed sensor 104 and/or wind direction sensor 105 is advantageously positioned in the middle of the respective blade 7 or blade section 13 and can be mounted on a rod 106 there as described above. Consequently, for each of the blades 7 or blade sections 13 positioned one above the other vertically, optimal pitch angles β can be separately set in order to take wind flow conditions that change in the vertical direction Z along the blade 7 into account during operation of the vertical wind turbine 1 and thus improve the efficiency of the turbine. This must be taken into consideration particularly for circular path diameters $D_K$ that are larger than 32 m, for example 45 m, in which case a total length $L_7$ of the blades 7 would then be approx. 73 m, for example.

| Reference Signs List | |
|---|---|
| 1 | vertical wind turbine |
| 2 | rotor |
| 3 | nacelle |
| 4 | tower system |
| 5 | footings |
| 6 | switchgear box |
| 7 | blade |
| 8 | blade mount |
| 9 | rotor hub |
| 10 | rotor arm |
| 10a | transverse connecting element |
| 11 | signaling and/or measuring mast |
| 12 | pitch drive |
| 13 | blade section |
| 13a | upper end section |
| 13b | upper middle section |
| 13c | lower middle section |
| 13d | lower end section |
| 14 | bearing point |
| 15 | transverse mount |
| 16 | transverse struts |
| 17 | support structure |
| 18 | strut |
| 19 | vane |
| 20 | arbor |
| 21 | bearing unit |
| 22 | bearing housing |
| 23 | rolling bearing |
| 24 | bearing shaft |
| 25 | motor shaft |
| 26 | blade axis |
| 27 | pitch motor |
| 28 | clearance |
| 29 | stator ring |

| Reference Signs List | |
|---|---|
| 30 | rotor ring |
| 31 | cooling body |
| 32 | cooling fins |
| 33 | rims |
| 34 | clamping set |
| 35 | motor housing |
| 36 | motor interior |
| 37 | wall/top |
| 38 | wall/bottom |
| 39 | bearing seat |
| 40 | motor flange |
| 40a | open space |
| 41 | end surface |
| 42 | mounting flange |
| 43 | counterpart end surface |
| 44 | connecting element |
| 45 | reinforcing rib |
| 46 | support rib |
| 47 | motor bearing |
| 48 | bearing receiving chamber |
| 49 | sealing element |
| 50 | inner ring |
| 51 | outer ring |
| 52 | transition section |
| 53 | vane axis section |
| 54 | rib |
| 55 | connecting end |
| 56 | fixing element |
| 57 | flange section |
| 58 | positive-fit element |
| 59 | further connecting element |
| 60 | outer skin |
| 61 | casing |
| 62 | upper shell |
| 63 | lower shell |
| 64 | drive gap |
| 65 | cooling opening |
| 66 | extension |
| 67 | end cap |
| 70 | drive train |
| 71 | drive shaft |
| 72 | pedestal |
| 73 | journal |
| 74 | hub shoulder |
| 75 | transition ring |
| 76 | rotor bearing system |
| 76a | first rotor bearing |
| 76b | second rotor bearing |
| 76c | third rotor bearing |
| 77 | bearing bush |
| 78 | rotor shaft |
| 79 | hub connection |
| 80 | hub connection |
| 80' | hub connection |
| 81 | transmission |
| 82 | output shaft |
| 83 | clutch unit |
| 84 | generator shaft |
| 85 | generator |
| 86 | intended break point |
| 87 | transmission housing |
| 88 | flange bell |
| 89 | double-tooth clutch |
| 90 | pitch pipe |
| 91 | base body |
| 92 | feed-through |
| 92' | feed-through |
| 93 | shaft bearing unit |
| 94 | supporting feet |
| 95 | rest |
| 96 | segment |
| 97 | flange end |
| 98 | supporting arm |
| 99 | supporting tab |
| 100 | chord line |
| 101 | leading edge |
| 102 | trailing edge |

| Reference Signs List | | |
|---|---|---|
| 103 | counterweight |
| 104 | wind speed sensor |
| 105 | wind direction sensor |
| 106 | rod |
| 107 | control device |
| 108 | supply unit |
| 109 | motor control unit |
| 110 | power section |
| 111 | choke |
| 112 | filter |
| 113 | line |
| 114 | power supply unit |
| 115 | control unit |
| 116 | main power supply unit |
| 117 | auxiliary power supply unit |
| 118 | motor protection unit |
| 119 | data transmission unit |
| 120 | rotary position transducer |
| 121 | position sensor |
| 122 | motor unit |
| 123 | temperature measuring unit |
| 124 | temperature sensor |
| 125 | other temperature sensor |
| 200 | test bench |
| 201 | frame structure |
| 202 | holding arm |
| 203 | transverse arm |
| 204 | shaft mount |
| 205 | swing arm |
| 206 | extension |
| 207 | weight |
| 208 | spring element |
| 209 | articulating linkage |
| i | transmission step-up factor |
| d | differential value |
| t | time |
| $v_W$ | wind speed |
| $v_U$ | circumferential speed |
| $v_R$ | relative speed |
| $v_1$ | starting wind speed |
| $v_2$ | nominal wind speed |
| $v_3$ | first cut-out wind speed |
| $v_4$ | further cut-out wind speed |
| $v_5$ | restart wind speed |
| A | control current |
| $B_4$ | maximum width of the tower system |
| $C_2$ | rotor rotation axis |
| $C_7$ | blade rotation axis |
| $C_{71}$ | drive rotation axis |
| $D_K$ | diameter of the circular path |
| $L_7$ | length of the blades |
| K | circular path |
| I | actual value |
| P1 | resistance force |
| P2 | lifting force |
| S | set-point value |
| S1 | first cam disk |
| S2 | further cam disk. |
| T | temperature measurement value |
| $T_x$ | other temperature meas. value |
| Tc | continuous torque |
| Ti | nominal torque |
| Tp | maximum torque |
| U | control value |
| $R_K$ | radius of the circular path |
| X | longitudinal direction |
| Y | transverse direction |
| Z | vertical direction, upward direction |
| α | angle of attack |
| β | pitch angle |
| $β_I$ | set-point pitch angle |
| $β_S$ | actual pitch angle |
| δ | angular deviation |
| γ | angle of incidence |
| λ | tip speed ratio |
| Θ | azimuth angle |
| ω | angular velocity |

The invention claimed is:

1. A vertical wind turbine comprising:
a plurality of vertical blades, which are each fastened to a respective vertical blade axis such that they are pivotable around a respective blade rotation axis independently of one another and are supported rotatable on a common circular path around a vertical rotor rotation axis; and
a plurality of pitch motors,
wherein each vertical blade axis is provided with and driven with at least one pitch motor from the plurality of pitch motors for motor-driven pivoting of each vertical blade of the plurality of vertical blades, and wherein
the vertical wind turbine is configured to control a pitch angle of the blades at least 1) in a partial load mode of the vertical wind turbine such that the blades rotate with a constant tip speed ratio, and
2) in nominal operation mode of the vertical wind turbine such that the blades rotate with a nominal speed and with a variable tip speed ratio based on wind speeds.

2. The vertical wind turbine according to claim 1, wherein the vertical wind turbine is designed to operate in the partial load mode in a range of wind speeds that at least partially lie between 3 and 12 m/s.

3. The vertical wind turbine according to claim 1, wherein the constant tip speed ratio amounts to between 2 and 2.6.

4. The vertical wind turbine according to claim 1, wherein the vertical wind turbine is configured to control the pitch angle so that in the nominal operation mode, the blades rotate at a constant nominal speed.

5. The vertical wind turbine according to claim 1, wherein at a first cut-out wind speed $v_3$ of the vertical wind turbine, the variable tip speed ratio λ amounts to between 1 and 1.8.

6. The vertical wind turbine according to claim 1, wherein the vertical wind turbine is configured to control the pitch angle in a start-up mode such that starting from a resistance mode with tip speed ratios of λ≤1, the blades transition into a fast mode with tip speed ratios of λ>1.

7. The vertical wind turbine according to claim 1, wherein the control of the pitch angle is based on at least one cam disk, which determines the pitch angle in a continuous manner for an entire rotation of the rotor.

8. The vertical wind turbine according to claim 1, wherein a maximum value of the pitch angle for windward positions of the blade is generally greater than for leeward positions of the blade, with respective regard to the rotor rotation axis.

9. The vertical wind turbine according to claim 1, wherein for wind speeds in the range of a nominal wind speed, at an azimuth angle of 0° measured from a zero line oriented perpendicularly to the wind direction, the pitch angle is less than zero.

10. The vertical wind turbine according to claim 1, wherein at least for wind speeds in the range of the nominal wind speed, with azimuth angles of 0° to 90° measured from a zero line oriented perpendicularly to the wind direction, there is a local maximum of the pitch angle.

11. The vertical wind turbine according to claim 1, wherein at least one wind speed sensor and/or at least one wind direction sensor, which is positioned on at least one of the blades and is connected in a signal-transmitting way to a control device for determining a setpoint of the pitch angle.

12. The vertical wind turbine according to claim 1, wherein at wind speeds from still air up to a further cut-off speed of the vertical wind turbine, an amount of a positioning error in the control of the pitch angle is always less than 5°.

13. The vertical wind turbine according to claim 1, wherein the constant tip speed ratio amounts to between 2.2 and 2.4.

14. The vertical wind turbine according to claim 1, wherein at a first cut-out wind speed v3 of the vertical wind turbine, the variable tip speed ratio λ amounts to between 1.3 and 1.5.

15. The vertical wind turbine according to claim 1, wherein at a first cut-out wind speed v3 of the vertical wind turbine, the variable tip speed ratio λ amounts to 1.38.

16. The vertical wind turbine according to claim 1, wherein at wind speeds from still air up to a further cut-off speed of the vertical wind turbine, an amount of a positioning error in the control of the pitch angle is always less than 3°.

17. The vertical wind turbine according to claim 1, wherein at wind speeds from still air up to a further cut-off speed of the vertical wind turbine, an amount of a positioning error in the control of the pitch angle is always less than 1.5°.

18. The vertical wind turbine according to claim 1, wherein each vertical blade comprises a plurality of blade sections.

19. The vertical wind turbine according to claim 1, wherein each blade can freely rotate 360°.

20. A kit for a vertical wind turbine according to claim 1.

21. A method comprising: operating a vertical wind turbine with a plurality of pitch motors and vertical blades each driven around a respective vertical blade axis and each vertical blade of the vertical blades is rotatably driven by a respective pitch motor from the plurality of pitch motors, the vertical blades having predetermined pitch angles, the operating the vertical wind turbine including controlling the pitch angle, at least in a partial load mode of the vertical wind turbine to rotate the vertical blades-with a constant tip speed ratio, and controlling the pitch angle in full-load mode of the vertical wind turbine to rotate the vertical blades with a nominal speed and with a variable tip speed ratio based on wind speeds.

* * * * *